(12) United States Patent
De Vita et al.

(10) Patent No.: US 10,164,548 B2
(45) Date of Patent: Dec. 25, 2018

(54) DELAY CONTROL FOR A POWER RECTIFIER

(71) Applicant: Marvell World Trade Ltd., St. Michael (BB)

(72) Inventors: Giuseppe De Vita, Pavia (IT); Alessandro Savo, Pavia (IT); Luca Collamati, Jesi (IT); Maurizio Costagliola, Pavia (IT)

(73) Assignee: Marvell World Trade Ltd., St. Michael (BB)

( * ) Notice: Subject to any disclaimer, the term of this patent is extended or adjusted under 35 U.S.C. 154(b) by 133 days.

(21) Appl. No.: 15/199,541

(22) Filed: Jun. 30, 2016

(65) Prior Publication Data

US 2017/0012553 A1  Jan. 12, 2017

Related U.S. Application Data

(60) Provisional application No. 62/189,468, filed on Jul. 7, 2015.

(51) Int. Cl.
*H02M 7/219* (2006.01)
*H02M 7/217* (2006.01)

(52) U.S. Cl.
CPC .......... *H02M 7/217* (2013.01); *H02M 7/219* (2013.01); *H02M 2007/2195* (2013.01)

(58) Field of Classification Search
CPC ..................... H02M 7/12–7/25; H02M 1/32
See application file for complete search history.

(56) References Cited

U.S. PATENT DOCUMENTS

| | | | |
|---|---|---|---|
| 9,876,440 B1* | 1/2018 | Lee | H02M 7/219 |
| 2010/0315849 A1* | 12/2010 | Ingemi | H02J 9/062 363/89 |
| 2015/0146466 A1* | 5/2015 | Kim | H02M 7/219 363/127 |
| 2017/0126021 A1* | 5/2017 | Desrosiers | H02J 5/005 |

FOREIGN PATENT DOCUMENTS

| | | |
|---|---|---|
| DE | 102013107774 A1 | 2/2015 |
| WO | WO2011008944 A1 | 1/2011 |

OTHER PUBLICATIONS

H. M. Lee and M. Ghovanloo, "An Integrated Power-Efficient Active Rectifier With Offset-Controlled High Speed Comparators for Inductively Powered Applications," in IEEE Transactions on Circuits and Systems I: Regular Papers, vol. 58, No. 8, pp. 1749-1760, Aug. 2011.*

Application No. EP 16178334.5, European Search Report dated Jan. 2, 2017, 8 pages.

* cited by examiner

*Primary Examiner* — Kyle J Moody
*Assistant Examiner* — Peter Novak

(57) ABSTRACT

A power rectifier rectifies alternating electric current by using a controller in the power rectifier to control a first delay circuit in the power rectifier to turn on a high side switch in the power rectifier, wherein the high side switch provides a path for power from an input voltage line of the power rectifier to an output voltage line of the power rectifier. The controller controls a second delay circuit in the power rectifier to maintain the high side switch in an on state to change a switching state of the high side switch based on detection, by a current inversion detector, of a current inversion associated with the input and output voltage lines of the power rectifier.

27 Claims, 13 Drawing Sheets

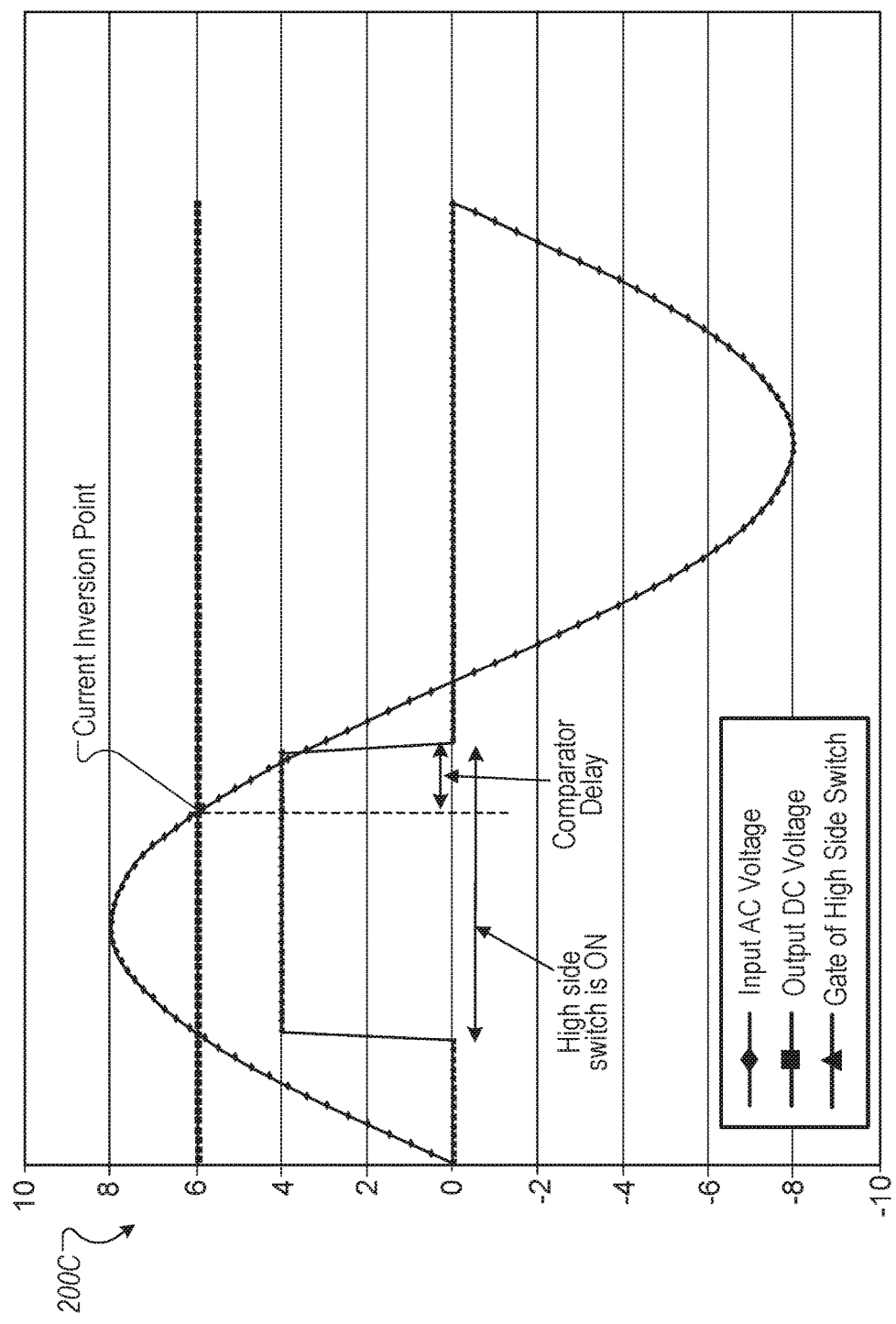

DELAY CONTROL FOR A POWER RECTIFIER

CROSS REFERENCE TO RELATED APPLICATIONS

This application claims the benefit of priority under 35 U.S.C. § 119(e) of U.S. Provisional Application No. 62/189,468, filed on Jul. 7, 2015, and entitled "ADAPTIVE HIGH-SIDE DRIVER FOR HIGH FREQUENCY RECTIFIER," which is incorporated herein by reference in its entirety.

BACKGROUND

The following disclosure relates generally to power rectifiers.

Many electrical and electronic devices operate on direct current (DC) voltage, while the input voltage provided to such devices can be alternating current (AC) voltage. A power rectifier circuit can be used to generate a DC voltage from the input AC voltage.

SUMMARY

The present disclosure describes an adaptive power rectifier and associated systems and techniques. In some implementations, the power rectifier (also referred to as a rectifier device or rectifier) rectifies an input AC voltage, e.g., generates an output DC voltage from the AC voltage, using one or more programmable delay circuits that drive high side switches in the rectifier. A programmable delay circuit includes a first delay circuit and a second delay circuit that couple a low side switch to the corresponding high side switch, a controller for controlling the delay associated with each delay circuit, and a current inversion detector for detecting when the input voltage falls below the output voltage.

The programmable delay circuit is configured to turn on the high side switch after a first delay associated with the first delay circuit, in response to the low side switch being turned on. The high side switch remains in the on state for a time duration that is based on a second delay associated with the second delay circuit. In some implementations, the controller is an adaptive controller that is configured to adapt or adjust the first delay to minimize the response time for turning on the high side switch after the low side switch is turned on. The controller is further configured to adjust the second delay to maximize the time for which the high side switch remains in the on state while avoiding current inversion.

In a general aspect, a power rectifier rectifies alternating electric current by using a controller in the power rectifier to control a first delay corresponding to a first delay circuit in the power rectifier to turn on a high side switch in the power rectifier, wherein the high side switch provides a path for power from an input voltage line of the power rectifier to an output voltage line of the power rectifier. The controller controls a second delay corresponding to a second delay circuit in the power rectifier to maintain the high side switch in an on state so as to change a switching state of the high side switch based on detection, by a current inversion detector, of a current inversion associated with the input and output voltage lines of the power rectifier. The current inversion indicates a condition of current flow from an output of the power rectifier to an input of the power rectifier.

Particular implementations of the above general aspect include one or more of the following features. In some implementations, detection of the current inversion by the current inversion detector comprises determining, by the current inversion detector, whether an output voltage of the power rectifier is greater than an input voltage of the power rectifier. Conditioned on determining that the output voltage of the power rectifier is greater than the input voltage of the power rectifier, the current inversion detector sends an indication of a detection of current inversion to the controller.

In some implementations, the controller is adapted to operate in one of a plurality of states that are configured to provide different operating functionalities to control at least one of the first delay or the second delay based on the detection of current inversion by the current inversion detector. The plurality of states including a configuration initialization state, an active state and a steady state. When operating in the active state, the controller decrements the first delay in stepwise increments and increments the second delay in stepwise increments responsive to detection of current inversion by the current inversion detector. The controller sets values of a first flag and a second flag in response to decrementing the first delay or incrementing the second delay, the first flag and the second flag indicating occurrence or absence of current inversion in the power rectifier. The controller transitions to the steady state based on setting values of the first flag and the second flag.

In some implementations, when operating in the active state, the controller decrements the first delay by a step value that corresponds to a unit length of delay, and sets a first flag and a second flag to a first flag value that indicates possible occurrence of current inversion in the power rectifier. The controller determines whether a first current inversion is detected by the current inversion detector. Conditioned on detecting the first current inversion, the controller increments the first delay by a step value, and sets the first flag to a second flag value. The controller increments the second delay by a step value. The controller determines whether a second current inversion detection is detected. Conditioned on detecting the second current inversion, the controller decrements the second delay by a step value, and sets the second flag to the second flag value. The controller determines whether the first flag and the second flag are set to the second flag value. Conditioned on determining that the first flag and the second flag are set to the second flag value, the controller transitions to a steady state. Conditioned on determining that at least one of the first flag or the second flag is not set to the second flag value, the controller repeats operations of the active state until the first flag and the second flag are set to the second flag value.

In some implementations, when operating in the steady state, the controller determines whether a preselected number of cycles of an input voltage of the power rectifier is completed. Conditioned on determining that the preselected number of cycles is not completed, the controller iteratively increases the first delay by step values and decreases the second delay by step values until a current inversion is detected by the current inversion detector. In response to detecting the current inversion by the current inversion detector, the controller transitions back to the active state.

In some implementations, when operating in the configuration initialization state, the controller initializes the first delay to a first delay value and initializes the second delay to a second delay value. The controller iteratively decrements the first delay by a step value while one or more current inversions are detected. In response to not detecting a current inversion, the controller transitions to the active state.

In another general aspect, a power rectifier comprises a low side switch and a high side switch coupled to the low side switch. The low side switch and the high side switch are configured to provide an electrical path for power from an input voltage line of the power rectifier to an output voltage line of the power rectifier. The power rectifier includes a first delay circuit and a second delay circuit coupled to control terminals of at least the high side switch, wherein a first delay of the first delay circuit controls a turn on time of the high side switch, and a second delay of the second delay circuit controls a turn off time of the high side switch. The power rectifier includes at least one controller coupled to the first and second delay circuits, the controller configured to control the first delay and the second delay based on current inversions associated with the input and output voltage lines of the power rectifier, a current inversion indicating a condition of current flow from an output of the power rectifier to an input of the power rectifier.

Particular implementations of the above general aspect include one or more of the following features. In some implementations, the power rectifier includes a current inversion detector that is configured to compare an output voltage of the power rectifier to an input voltage of the power rectifier and determine whether the output voltage of the power rectifier is greater than the input voltage of the power rectifier based on the comparison. Conditioned on determining that the output voltage of the power rectifier is greater than an input voltage of the power rectifier, the current inversion detector detects an occurrence of a current inversion in the power rectifier. Upon detecting the occurrence of a current inversion, the current inversion detector provides an indication of the current inversion detection to the controller.

In some implementations, the controller is an adaptive controller operable in one of a plurality of states that are configured to provide different operating functionalities to control at least one of the first delay or the second delay based on detection of current inversions. The plurality of states including a configuration initialization state, an active state and a steady state. In some implementations, when operating in the active state the adaptive controller is configured to decrement the first delay in stepwise increments and increment the second delay in stepwise increments responsive to detection of current inversion by the current inversion detector. The adaptive controller is configured to set values of a first flag and a second flag in response to decrementing the first delay or incrementing the second delay, the first flag and the second flag indicating occurrence or absence of current inversion in the power rectifier. The adaptive controller is configured to transition to the steady state based on setting values of the first flag and the second flag.

In some implementations, when the adaptive controller is the active state, the adaptive controller is further configured to decrement the first delay by a step value that corresponds to a unit length of delay, and set the first flag and the second flag to a first flag value that indicates possible occurrence of current inversion in the power rectifier. The adaptive controller determines an occurrence of a first current inversion. In response to the occurrence of the first current inversion, the adaptive controller increments the first delay by a step value, and sets the first flag to a second flag value. The adaptive controller increments the second delay by a step value. The adaptive controller determines an occurrence of a second current inversion. In response to the occurrence of the second current inversion, the adaptive controller decrements the second delay by a step value, and sets the second flag to the second flag value. The adaptive controller determines whether the first flag and the second flag are set to the second flag value. In response to determining that the first flag and the second flag are set to the second flag value, the adaptive controller transitions to a steady state. In response to determining that at least one of the first flag or the second flag is not set to the second flag value, the adaptive controller repeats operations of the active state until the first flag and the second flag are set to the second flag value.

In some implementations, when in the steady state, the adaptive controller is configured to determine whether a preselected number of cycles of an input voltage of the power rectifier is completed. Conditioned on determining that the preselected number of cycles is not completed, the adaptive controller iteratively increases the first delay by a step value and decreases the second delay by a step value until a current inversion is detected by the current inversion detector. In response to detecting the current inversion by the current inversion detector, the adaptive controller transitions back to the active state.

In some implementations, when in the configuration initialization state, the adaptive controller is configured to initialize the first delay to a first delay value and initialize the second delay to a second delay value. The adaptive controller iteratively decrements the first delay by a step value while one or more current inversions are detected. In response to not detecting a current inversion, the adaptive controller transitions to the active state.

In some implementations, the power rectifier is configured to turn on or turn off the high side switch based on at least the first delay or the second delay, without performing a current comparison using a comparator coupled to the high side switch.

In some implementations, the low side switch and the high side switch are configured to provide the path for power from the input line to the output line of the power rectifier during a first half cycle of an input voltage, wherein the first delay of the first delay circuit controls the turn on time of the high side switch with respect to a turn on time of the low side switch. The power rectifier further comprises a second high side switch and a second low side switch coupled to the second high side switch. The second low side switch and the second high side switch provide a path for power from the input voltage line of the power rectifier to the output voltage line of the power rectifier during a second half cycle of the input voltage. The power rectifier further comprises a third delay circuit and a fourth delay circuit coupled to control terminals of at least the second high side switch. A third delay of the third delay circuit controls a turn on time of the second high side switch, and a fourth delay of the fourth delay circuit controls a turn off time of the second high side switch. The controller is coupled to the third and fourth delay circuits and configured to control the third delay and the fourth delay based on current inversions associated with the input and output voltage lines of the power rectifier.

In some implementations, at least one of the first delay circuit or the second delay circuit includes a programmable counter that is configured to measure a corresponding delay. In some implementations, the programmable counter includes a number of bits that are configured to record a value of at least the first delay or the second delay.

In some implementations, at least one of the first delay circuit or the second delay circuit includes one or more flip-flops. In some implementations, at least one of the first delay circuit or the second delay circuit includes one or more capacitors. In some implementations, the controller comprises a field programmable gate array (FPGA).

In some implementations, the first delay circuit is coupled to an output of the low side switch and the second delay circuit is coupled to an output of the first delay circuit. The power rectifier further comprises an inverter that is coupled to an output of the second delay circuit and a logic gate that is coupled to the output of the first delay circuit and to an output of the inverter, the logic gate configured to provide an output based on a value of the first delay and a value of the second delay. The power rectifier further comprises a level shifter that is configured to couple the output of the logic gate to a driver circuit, and the driver circuit that is configured to drive a gate of the high side switch based on the output of the level shifter.

In another general aspect, an electronic device comprises a power input circuit and a power rectifier coupled to the power input circuit. The power input circuit is configured to receive an alternating magnetic field from a power source and provide alternating current (AC) power to a power rectifier. The power rectifier comprises a low side switch and a high side switch coupled to the low side switch. The low side switch and the high side switch are configured to provide an electrical path for power from an input voltage line of the power rectifier to an output voltage line of the power rectifier. The power rectifier also includes a first delay circuit and a second delay circuit coupled to control terminals of at least the high side switch, wherein a first delay of the first delay circuit controls a turn on time of the high side switch, and a second delay of the second delay circuit controls a turn off time of the high side switch. The power rectifier further includes at least one controller coupled to the first and second delay circuits and configured to control the first delay and the second delay based on current inversions associated with the input and output voltage lines of the power rectifier, a current inversion indicating a condition of current flow from an output of the power rectifier to an input of the power rectifier.

Particular implementations of the above general aspect include one or more of the following features. In some implementations, the power rectifier includes a current inversion detector that is configured to compare an output voltage of the power rectifier to an input voltage of the power rectifier and determine whether the output voltage of the power rectifier is greater than the input voltage of the power rectifier based on the comparison. Conditioned on determining that the output voltage of the power rectifier is greater than the input voltage of the power rectifier, the current inversion detector detects an occurrence of a current inversion in the power rectifier. Upon detecting the occurrence of a current inversion, the current inversion detector provides an indication of the current inversion detection to the controller.

In some implementations, the controller is an adaptive controller operable in one of a plurality of states that are configured to provide different operating functionalities to control at least one of the first delay or the second delay based on detection of current inversions. The plurality of states includes a configuration initialization state, an active state and a steady state.

In some implementations, when operating in the active state, the adaptive controller is configured to decrement the first delay in stepwise increments and increment the second delay in stepwise increments responsive to detection of current inversion by the current inversion detector. The adaptive controller sets values of a first flag and a second flag in response to decrementing the first delay or incrementing the second delay, the first flag and the second flag indicating occurrence or absence of current inversion in the power rectifier. The adaptive controller transitions to the steady state based on setting values of the first flag and the second flag.

In some implementations, when the adaptive controller is the active state, the adaptive controller is configured to decrement, the first delay by a step value that corresponds to a unit length of delay, and set the first flag and the second flag to a first flag value that indicates possible occurrence of current inversion in the power rectifier. The adaptive controller determines an occurrence of a first current inversion. In response to occurrence of the first current inversion, the adaptive controller increments the first delay by a step value, and sets the first flag to a second flag value. The adaptive controller increments the second delay by a step value. The adaptive controller determines an occurrence of a second current inversion. In response to occurrence of the second current inversion, The adaptive controller decrements the second delay by a step value, and sets the second flag to the second flag value. The adaptive controller determines whether the first flag and the second flag are set to the second flag value. In response to determining that the first flag and the second flag are set to the second flag value, the adaptive controller transitions to a steady state. In response to determining that at least one of the first flag or the second flag is not set to the second flag value, the adaptive controller repeats operations of the active state until the first flag and the second flag are set to the second flag value.

In some implementations, when operating in the steady state, the adaptive controller is configured to determine whether a preselected number of cycles of an input voltage of the power rectifier is completed. Conditioned on determining that the preselected number of cycles is not completed, the adaptive controller iteratively increases the first delay by a step value and decreases the second delay by a step value until a current inversion is detected by the current inversion detector. In response to detecting the current inversion by the current inversion detector, the adaptive controller transitions back to the active state.

In some implementations, when operating in the configuration initialization state, the adaptive controller is configured to initialize the first delay to a first delay value and initialize the second delay to a second delay value. The adaptive controller iteratively decrements the first delay by a step value while one or more current inversions are detected. In response to not detecting a current inversion, the adaptive controller transitions to the active state.

In some implementations, the power rectifier is configured to turn on or turn off the high side switch based on at least the first delay or the second delay, without performing a current comparison using a comparator coupled to the high side switch. In some implementations, the power source is external to the electronic device and is configured to generate the alternating magnetic field. The power input circuit includes a coil that is configured to generate the alternating current in response to receiving the alternating magnetic field from the power source.

In another general aspect, a wireless charger comprises a power input circuit and a power rectifier. The power input circuit, which includes a coil, is configured to wirelessly receive, from an external power source, an alternating magnetic field. The power input circuit generates, using the coil, an alternating current (AC) based on receiving the alternating magnetic field, and provides the AC to the power rectifier. The power rectifier is configured to generate direct current (DC) power at its output. The power rectifier comprise a low side switch and a high side switch coupled to the low side switch. The low side switch and the high side switch are configured to provide an electrical path for power from an input voltage line of the power rectifier to an output voltage line of the power rectifier. The power rectifier also includes a first delay circuit and a second delay circuit coupled to control terminals of at least the high side switch, wherein a first delay of the first delay circuit controls a turn on time of the high side switch, and a second delay of the second delay circuit controls a turn off time of the high side switch. The power rectifier further includes at least one controller coupled to the first and second delay circuits and configured to control the first delay and the second delay based on current inversions associated with the input and output voltage lines of the power rectifier, a current inversion indicating a condition of current flow from an output of the power rectifier to an input of the power rectifier.

In another general aspect, a wireless charging system comprises a power source and a receiver. The power source is configured to generate an alternating magnetic field and wirelessly provide the alternating magnetic field to the receiver. The receiver is configured to generate direct current (DC) power based on the alternating magnetic field provided by the power source. The receiver comprises a power input circuit and a power rectifier. The power input circuit is configured to wirelessly receive the alternating magnetic field from the power source. The power input circuit generates an alternating current (AC) based on receiving the alternating magnetic field, and provides the AC to the power rectifier. The power rectifier is configured to generate DC power at its output. The power rectifier comprises a low side switch and a high side switch coupled to the low side switch. The low side switch and the high side switch are configured to provide an electrical path for power from an input voltage line of the power rectifier to an output voltage line of the power rectifier. The power rectifier includes a first delay circuit and a second delay circuit coupled to control terminals of at least the high side switch, wherein a first delay of the first delay circuit controls a turn on time of the high side switch, and a second delay of the second delay circuit controls a turn off time of the high side switch. The power rectifier includes at least one controller coupled to the first and second delay circuits and configured to control the first delay and the second delay based on current inversions associated with the input and output voltage lines of the power rectifier, a current inversion indicating a condition of current flow from an output of the power rectifier to an input of the power rectifier.

Implementations of the above include devices, systems and methods. One such system includes an electronic device that is associated with a power rectifier, which is configured to perform the above-described actions and provide the generated DC voltage to components of the electronic device.

In some implementations, the programmable delay circuit consumes small amounts of power in comparison to alternative options, e.g., using high side comparators in the power rectifier that are coupled to high side switches. In some implementations, the programmable delay circuit occupies less silicon area compared to the high side comparators. By replacing high side comparators in a power rectifier with one or more programmable delay circuits, the devices, systems and techniques disclosed in this application leads to reduced power consumption of the rectifier, and also lead to smaller rectifier circuits. In some implementations, the controller adjusts the turn on period for the high side switches depending on the frequency of the input AC voltage, thereby providing high power conversion efficiency of the rectifier over a wide frequency range. The controller reacts to variations in the operating conditions of the rectifier (e.g., due to load, temperature or supply variations) by adjusting the delays associated with the programmable delay circuit, to maintain high power efficiency of the rectifier.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIGS. 2A 2B and 2C show examples of graphs illustrating operating characteristics of a conventional power rectifier.

DETAILED DESCRIPTION

Power rectifiers are used in many applications to generate a DC voltage from an input AC voltage. For example, rectifiers are used in Radio-Frequency Identification (RFID) chips, Near Field Communication (NFC) chips, wireless chargers and in various other applications including, but not limited to, applications in which power is transferred to a device through a magnetic field.

Figure 1:
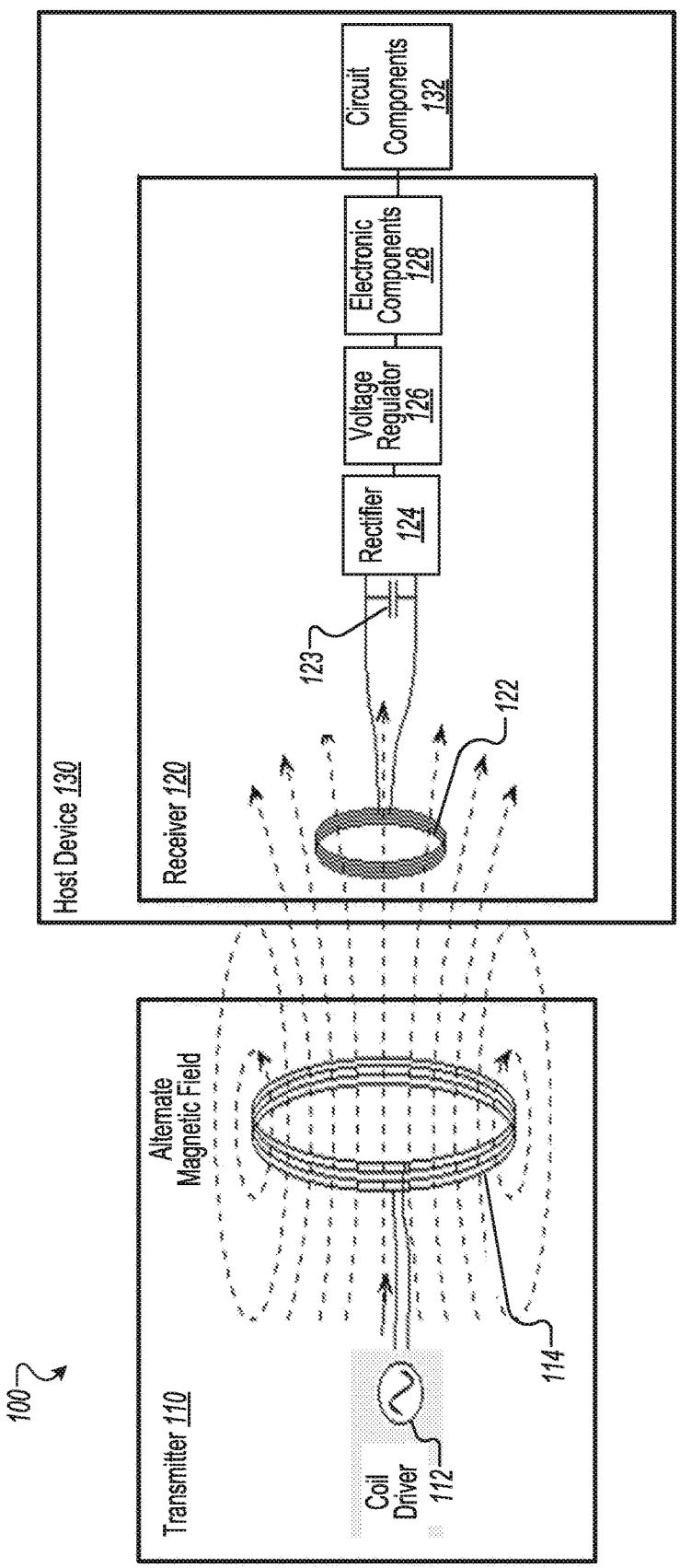
FIG. 1 illustrates an example of a block diagram of a system that uses an adaptive power rectifier with programmable delay circuits, according to one or more implementations.

FIG. 1 illustrates an example of a block diagram of a system 100 that uses an adaptive power rectifier with programmable delay circuits, according to one or more implementations. The system 100 includes a transmitter 110, a receiver 120 and a host device 130. The transmitter 110 includes a coil driver 112 and a primary coil 114. The receiver 120 includes a secondary coil 122, a capacitor 123, an adaptive power rectifier 124, a voltage regulator 126, and electronic components 128. The host device 130 includes circuit components 132.

The system 100 including the transmitter 110 is illustrative of some implementations. In other implementations, the transmitter 110 is not part of the system 100. In such implementations, the system 100 includes the receiver 120 and the host device 130, including their respective components. In such cases, the transmitter 110 is a device, or a component of a device, that is external to the system 100, and provides alternating current power to the system 100, e.g., to the receiver 120.

The transmitter 110 is an electrical device that is connected to a power source (e.g., a wall electrical outlet) and provides power wirelessly to the receiver 120. For example, in some implementations, the transmitter 110 is the base station section of a wireless charger, such as a charging pad for electronic devices. The transmitter 110 receives alternating current from the power source and provides the current to the primary coil 114. The coil driver 112 drives the primary coil 114. When the input alternating current flows through the primary coil 114, an alternating magnetic field is generated. A portion of the magnetic field is received at the secondary coil 122 in the receiver 120.

The receiver 120 is an electrical device that receives power wirelessly from the transmitter 110. In some implementations, the receiver 120 is included in the host device 130. In some implementations, the host device 130 is a portable electronic device, such as a cellular phone, a tablet computer, an electronic book reader, a music player, a smart watch, an activity monitor, a geolocation device, a notebook computer, a camera, an RFID or an NFC chip, or other suitable device, with built-in wireless charging capability. In some implementations, the receiver 120 is a wirelessly chargeable battery and associated circuitry included in the portable electronic device. The receiver 120 receives power wirelessly from the transmitter 110 and rectifies the input AC voltage to generate a DC voltage, which provides power to the circuit components 132 of the host device 130. The host device 130 with the receiver 120 can be placed within a certain threshold physical proximity to the transmitter 110 for transferring power wirelessly using the magnetic field generated by the primary coil 114. However, in some other implementations, the receiver 120 is a standalone electric device that is not included in a host device 130.

When the secondary coil 122 in the receiver 120 receives the alternating magnetic field from the transmitter 110, an alternating current is induced in the secondary coil 122. The alternating current is then converted into an AC voltage at the terminals of the capacitor 123. Then the adaptive power rectifier 124 is used to convert the AC voltage into a DC voltage.

As described in greater detail below with respect to FIGS. 3A-3B and 4-8, the adaptive power rectifier 124 includes one or more low side switches and high side switches, one or more programmable delay circuits, a controller for adjusting delays generated by the programmable delay circuits, and a current inversion detector for detecting when the input voltage falls below the output voltage.

In some implementations, the adaptive power rectifier 124 is a half bridge power rectifier, e.g., a rectifier that is configured to rectify an input AC voltage during one half cycle of the input AC signal, e.g., the positive half cycle or the negative half cycle, but not both. In such cases, the power rectifier 124 includes a low side switch that is coupled to a high side switch through a programmable delay circuit, which includes a first delay circuit and a second delay circuit that couple the associated low side switch to the corresponding high side switch in the pair.

In some implementations, the adaptive power rectifier 124 is a full bridge power rectifier, e.g., a rectifier that is configured to rectify an input AC voltage during both the positive and negative half cycles of the input AC signal. In such cases, the power rectifier 124 includes two low side switches and two high side switches. One low side switch is coupled to one high side switch, forming a first pair that processes an input AC signal during the positive half cycle of the signal. A first programmable delay circuit couples the low side switch to the corresponding high side switch in the first pair. The first programmable delay circuit includes a first delay circuit and a second delay circuit that couple the low side switch to the high side switch in the first pair. The other low side switch is coupled to the other high side switch, forming a second pair that processes the input AC signal during the negative half cycle of the signal. A second programmable delay circuit couples the low side switch to the corresponding high side switch in the second pair. The second programmable delay circuit includes a third delay circuit and a fourth delay circuit that couple the low side switch to the high side switch in the second pair.

When the input AC signal is in the positive half cycle, the low side switch of the first pair is turned on while the low side switch of the second pair is turned off. The low side switch of the first pair drives the corresponding high side switch of the first pair through the first programmable delay circuit. The controller is configured to adjust a first delay associated with the first delay circuit and a second delay associated with the second delay circuit, based on receiving signals from the current inversion detector indicating when the AC voltage input the power rectifier 124 falls below the DC voltage output by the power rectifier 124 during the positive half cycle. In response to the low side switch of the first pair being turned on, the corresponding high side switch is turned on after the first delay associated with the first delay circuit. In this configuration of the first pair of switches, an output capacitor of the power rectifier is charged during the positive half cycle through a power path that includes the input terminals of the rectifier, the low side and high side switches of the first pair, and the first and the second delay circuits of the first programmable delay circuit. The high side switch remains in the on state for a time duration that is based on the second delay associated with the second delay circuit. The controller sets the values of the first delay and the second delay such that the high side switch of the first pair is turned on and off, respectively, avoiding current inversions, which could otherwise discharge the output capacitor.

In this context, a current inversion refers to a condition when current flows in the reverse direction from the output of the rectifier to the input of the rectifier. Such a condition can occur when a high side switch is turned on at a time the input AC voltage of the rectifier device is less than the output DC voltage, allowing current to flow in a reverse path from the output to the input of the rectifier. Current inversion in a rectifier can cause a large loss in the power efficiency of the rectifier device.

In some implementations, the controller is an adaptive controller that is configured to adapt or adjust the first delay to minimize the response time for turning on the high side switch after the low side switch is turned on. The controller is further configured to adjust the second delay to maximize the time for which the high side switch remains in the on state while avoiding current inversion.

In implementations where the adaptive power rectifier is a half bridge rectifier, the rectification is limited to one half cycle, for example, in a manner similar to that described above with respect first pair of switches for the positive half cycle of the input AC voltage. In implementations where the adaptive power rectifier is a full bridge rectifier, the rectification is performed in both half cycles. In such cases, when the input AC signal is in the negative half cycle, the low side switch of the first pair is turned off while the low side switch of the second pair is turned on. The low side switch of the second pair drives the corresponding high side switch of the second pair through the second programmable delay circuit. The controller is configured to adjust a third delay associated with the third delay circuit and a fourth delay associated with the fourth delay circuit, based on receiving signals from the current inversion detector indicating when the AC voltage input the power rectifier 124 falls below the DC voltage output by the power rectifier 124 during the negative half cycle. In response to the low side switch of the second pair being turned on, the corresponding high side switch is turned on after the third delay associated with the third delay circuit. In this configuration of the second pair of switches, the output capacitor of the power rectifier is charged during the negative half cycle through a power path that includes the input terminals of the rectifier, the low side and high side switches of the second pair, and the third and the fourth delay circuits of the second programmable delay circuit. The high side switch of the second pair remains in the on state for a time duration that is based on the fourth delay associated with the fourth delay circuit. The controller sets the values of the third delay and the fourth delay such that the high side switch of the second pair is turned on and off, respectively, avoiding current inversions during the negative half cycle of the input AC signal.

In the above manner, the power rectifier 124 rectifies the AC voltage received from the capacitor 123 by using a controller to adjust delays associated with one or more programmable delay circuits in the rectifier, which drives the high side switches in the rectifier. The programmable delay circuit(s), the controller and the current inversion detector replaces comparators that are used in conventional power rectifiers, leading to improvements in energy consumption by the power rectifier, and/or reduction in size of the power rectifier, as also described in greater detail herein below.

Returning to the description of the receiver 120, the voltage regulator 126 generates a regulated DC voltage from the DC voltage output by the rectifier. The regulated DC voltage supplies the load to various circuits, e.g., circuit components 132, of the host device 130. The electronic components 128 of the receiver 120 provide an interface to connect to the circuit components 132 of the host device. In some implementations, the circuit components 132 include one or more processors, memory circuits, display circuits, audio components, optical input components, sensors and transceivers, among others.

In the above manner, power is transferred wirelessly from the transmitter 110 to the receiver 120 in the system 100. In the case of a wireless charger for a portable electronic device, suitably a cellular phone or a tablet computer for example, the power is transferred from the base station to a host electronic device, whose battery is then charged, in the case of an NFC or RFID system the power is transferred from the reader to the portable device and it is then supplied to the NFC or RFID chip, respectively.

In some implementations, the frequency of the magnetic field depends on the system. For example, NFC and RFID typically use a 13.56 MHz (megahertz) magnetic field, while a wireless charger for a portable electronic device typically operates using a 6.78 MHz magnetic field (e.g., when based on the Alliance for Wireless Power (A4WP) standard), or using a field in the frequency range from 100 kHz (kilohertz) to 205 kHz (e.g., when based on the Qi standard), among other frequencies, depending on the standard used. The rectifier 124 is configured to rectify an input AC voltage at the same frequency as that of the magnetic field generated by the transmitter 110.

The power efficiency of a rectifier is measured as a percentage of the input AC power that is converted into output DC power. For example, an efficiency of 100% means that all the AC power input to the adaptive power rectifier 124 is converted into output DC power, which can be used to supply the rectifier load. In some cases, it can be challenging to design an efficient rectifier that converts all or substantially all (e.g., efficiency over 90-95%) the input AC power into output DC power. This can be the case, for example, when the input AC voltage has frequency in a range of MHz, rather than in a range of hundreds of kHz. In the case of a wireless charger for a portable electronic device, the transferred power can be between 5 W (watts) and 10 W. In such a case, a rectifier efficiency larger than 90% is desired, to charge the device battery rapidly and/or to minimize thermal issues in the device to be charged. The importance of design of a power rectifier with high efficiency (e.g., greater than 90%) is amplified when the wireless charger operates at high frequency. For example, in some cases, a wireless charger is based on the Alliance for Wireless Power (A4WP) standard, which uses an operating frequency of 6.78 MHz. Additionally, for some applications such a wireless charger also needs to provide up to 10 W power without thermal issues.

Figure 2A:
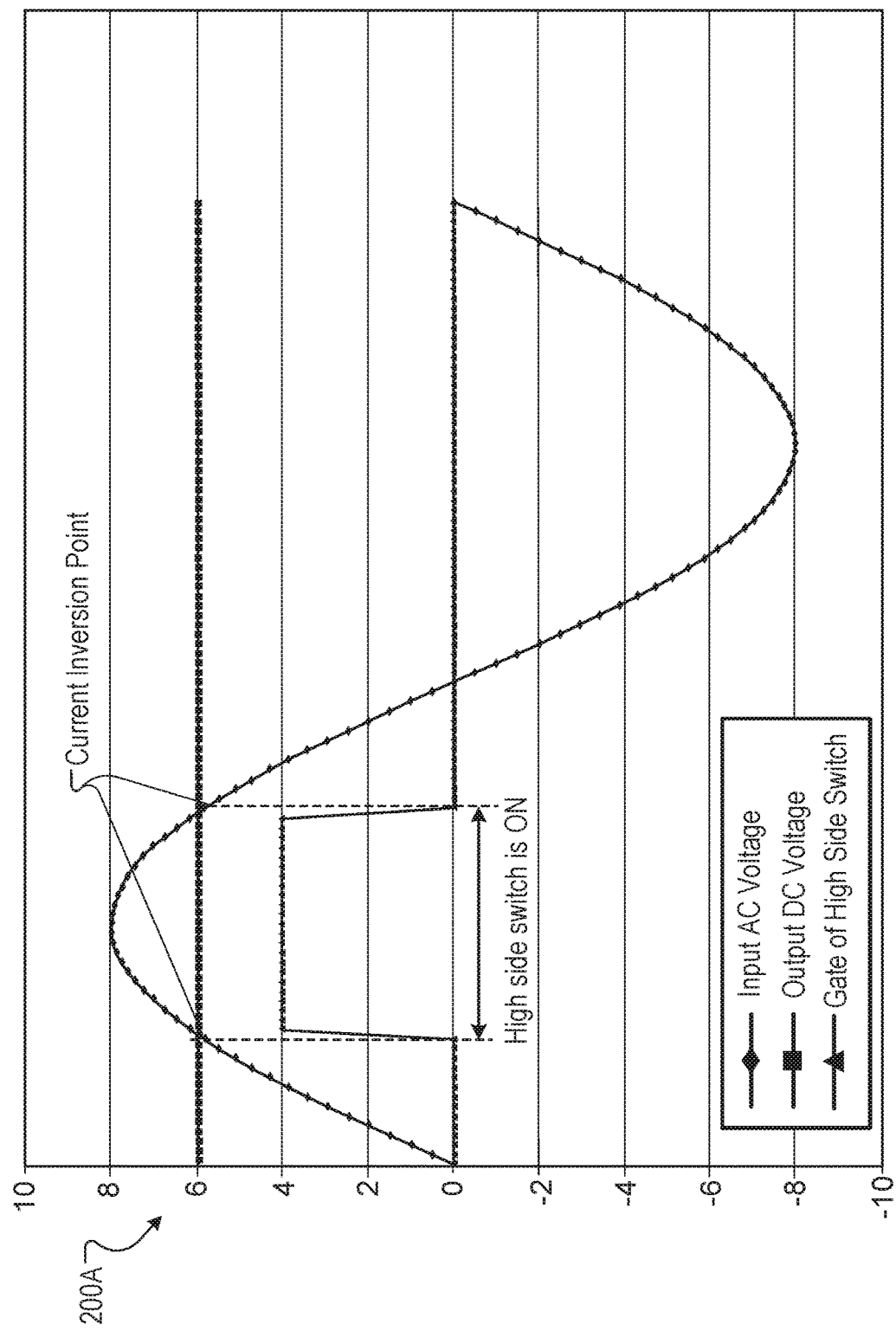
Figure 2B:
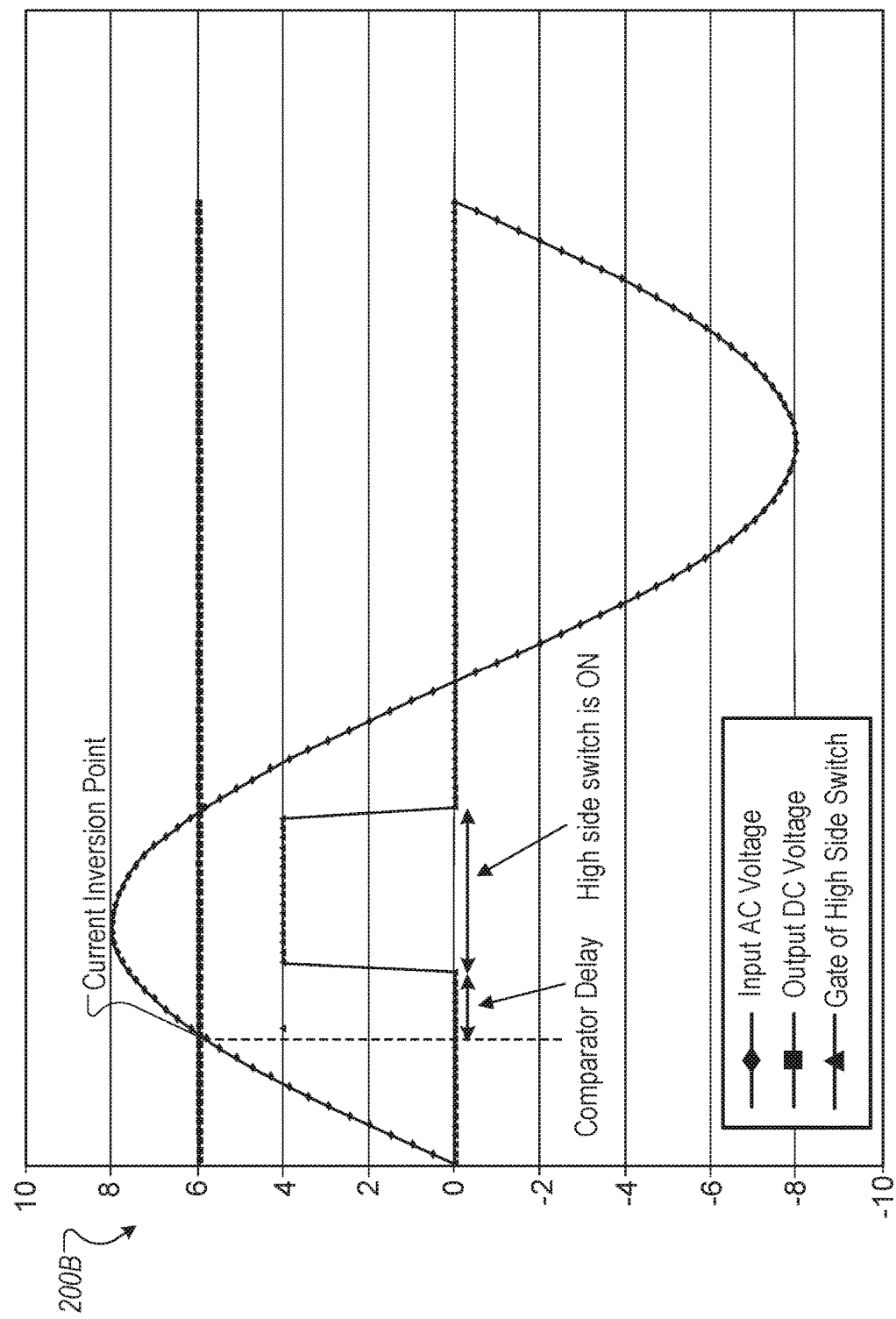

High efficiencies desired for high frequency operation can be achieved by avoiding current inversions in the power rectifier. FIGS. 2A, 2B and 2C show examples of graphs 200A, 200B and 200C illustrating operating characteristics of a conventional power rectifier. The graph 200A in FIG. 2A shows an ideal situation, where the high side switch of the first pair is turned on, during the positive half cycle of the input AC signal, for the entire time interval during which the input AC voltage is greater than the output DC voltage.

In some cases, a conventional power rectifier includes a comparator that couples a low side switch to a high side switch, and the comparator is configured to drive the high side switch when the corresponding low side switch is turned on. However, the comparator has a finite delay in turning on the high side switch, which reduces the time interval during which power is transferred from the input to the output, leading to a reduction in the power efficiency of the rectifier. In contrast to the graphs of FIGS. 2B and 2C, the graphs of FIGS. 5A, 5B, 8A and 8B, described herein below, which illustrate examples of the operation of the power rectifier 124 that uses programmable delay circuits to couple the low side switches to the high side switches, the graph 200B in FIG. 2B shows the operating situation when a comparator coupled to a high side switch turns on the high side switch, during the positive half cycle of the input AC signal, delayed by a finite time interval after the input AC voltage becomes greater than the output DC voltage. Accordingly, the high side switch does not stay on for the entire time interval during which the input AC voltage is greater than the output DC voltage during the positive half cycle of the input AC signal. This causes a reduction in efficiency compared to the situation illustrated by the graph 200A.

In some cases, the comparator has a finite delay in turning off the high side switch when the input AC voltage becomes smaller than the output DC voltage in a half cycle. The comparator delay in turning off the high side switch can cause current inversion in the power rectifier, leading to a reduction in the power efficiency of the rectifier. The graph 200C in FIG. 2C shows the operating situation in which a comparator coupled to the high side switch has a finite delay in turning off the high side switch after the input AC voltage becomes lesser than the output DC voltage during the positive half cycle of the input AC signal. Accordingly, the high side switch of the first pair stays on for a finite time after the input AC voltage becomes lesser than the output DC voltage during the positive half cycle, resulting in current inversion during this time period.

The graphs 200A-200C indicate that the reduction in power efficiency of a power rectifier can be limited by eliminating or reducing the comparator delays in turning on or turning off the corresponding high side switch. The power rectifier 124 achieves improved power efficiencies by using one or more programmable delay circuits to couple the low side switches to the high side switches, replacing comparators. As indicated above, the power rectifier 124 utilizes a controller to introduce suitable time delays associated with the one or more programmable delay circuits, such that the high side switches are activated for time intervals during which the input AC voltage is greater than the output DC voltage, but are deactivated for time intervals during which the input AC voltage is less than the output DC voltage. Contrasting with the graphs of FIGS. 2B and 2C, the graphs of FIGS. 5A, 5B, 8A and 8B, described herein below, illustrate examples of the operation of the power rectifier 124, in which the controller adjusts the delays associated with the programmable delay circuits of the power rectifier 124 to maximize the time period during which the high side switches in the rectifier remain on while avoiding current inversions. In this manner, the power rectifier increases the transfer of power from input to output avoiding current inversion, and accordingly, obtains high power efficiency.

In some implementations, the power rectifier 124 is used in wireless chargers of portable electronic devices, for example in situations where the input and output voltages of the rectifier are large, e.g., in the range of 15 V (volts) or more. By using programmable delay circuits, a controller and a current inversion detector to replace comparators, the power rectifier 124 provides large voltages in high frequency operations without consuming large amounts of power, in contrast to conventional rectifiers that use comparators to couple the low side and high side switches. Additionally or alternatively, the power rectifier 124 maintains a reduced size footprint by using the programmable delay circuits, thereby limiting the sizes of the host electronic devices. In contrast, the comparators used in conventional rectifiers used for high frequency and high voltage operations can occupy large areas in the rectifier circuits, thereby leading to larger rectifiers.

Figure 3A:
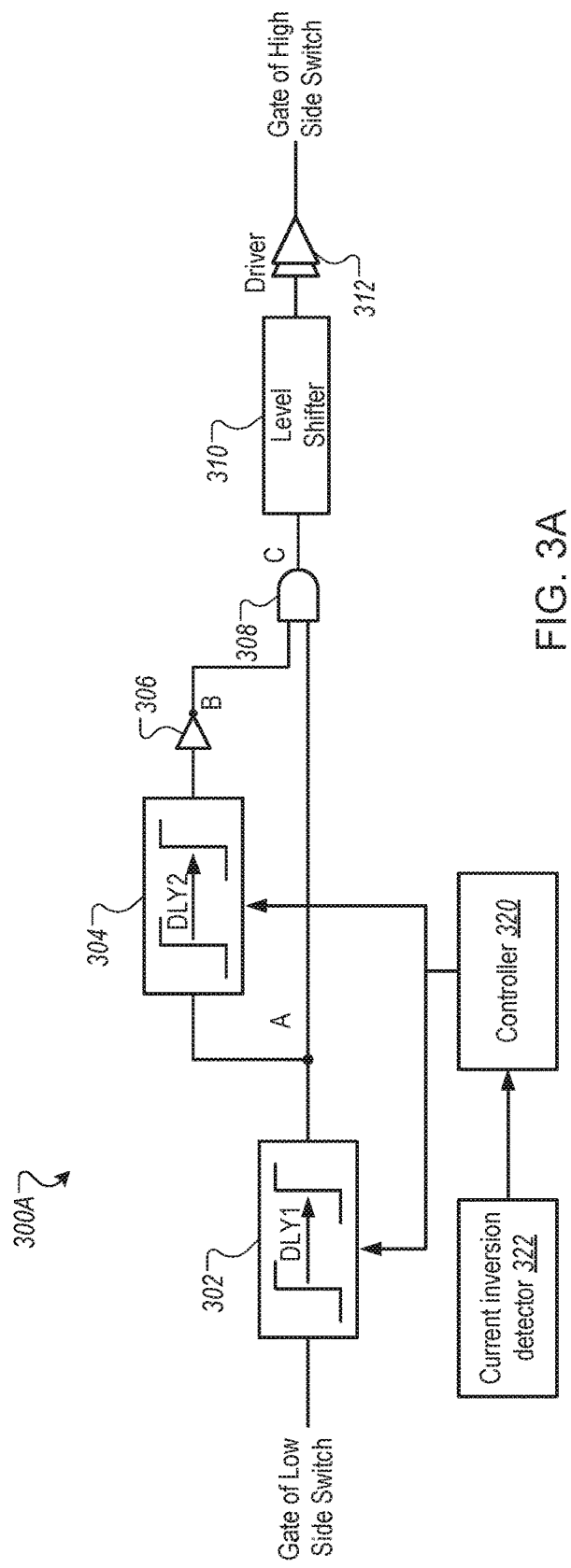
FIGS. 3A and 3B illustrate examples of a programmable delay circuit and a power rectifier that includes programmable delay circuits, respectively, according to one or more implementations.
Figure 3B:
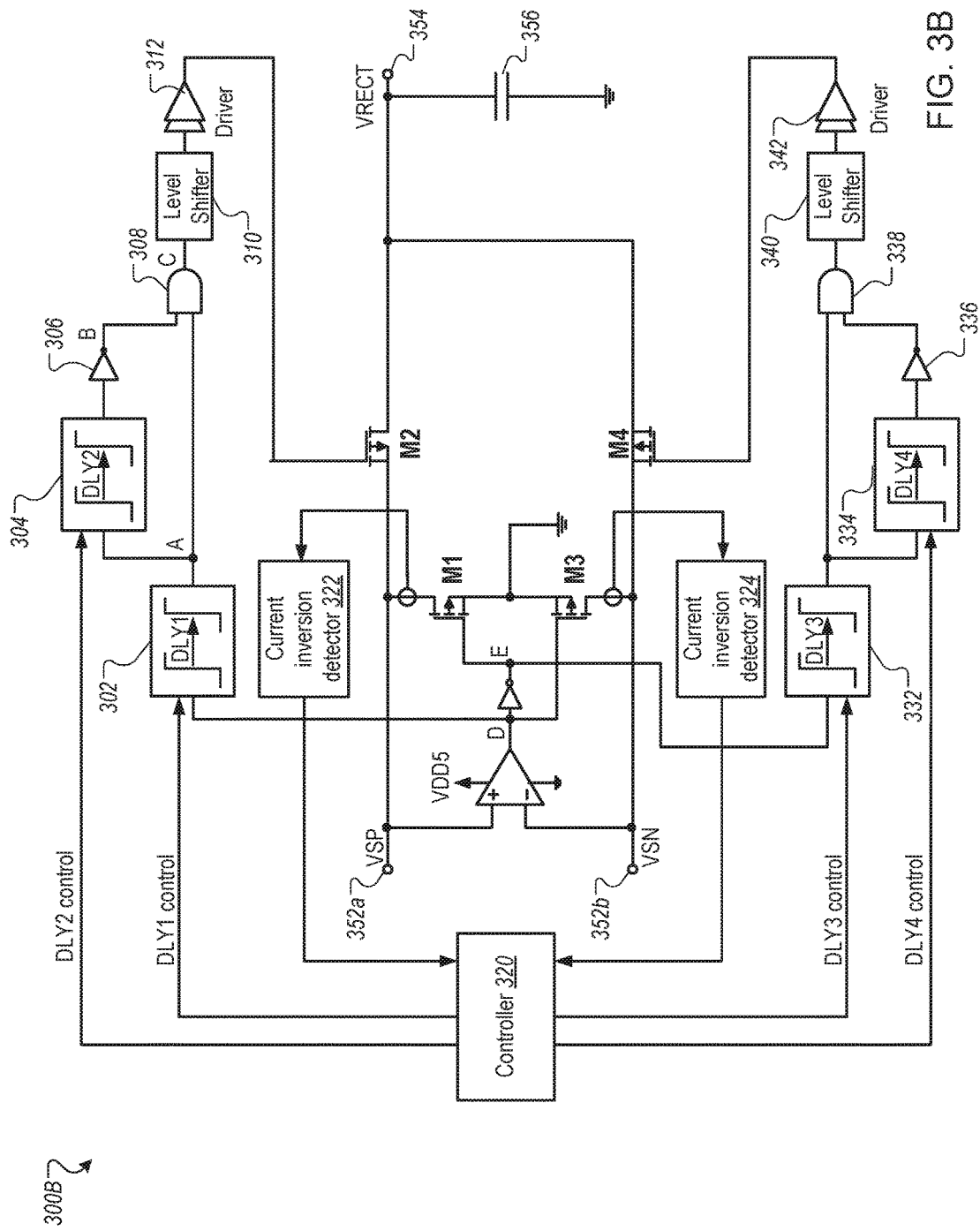

FIGS. 3A and 3B illustrate examples of a programmable delay circuit 300A and a power rectifier 300B that includes programmable delay circuits, respectively, according to one or more example implementations. As indicated above and also described in greater detail below, a programmable delay circuit is used to activate and deactivate a high side switch using adaptive delays that are controlled by a controller, based on the low side switch providing a signal output to the programmable delay circuit upon receiving an AC input signal. The controller performs the delay adjustment dynamically, e.g., to maximize the time interval when the high side switch is turned on while the input AC voltage is greater than the output DC voltage, while avoiding current inversions. A current inversion detector is used to read the input and output voltages, and send a signal to the controller to indicate whether the input AC voltage is less than the output DC voltage. FIG. 3A shows a programmable delay circuit 300A that is used for generating a DC voltage in a power rectifier based on one-half cycle of an input AC signal. The programmable delay circuit 300A includes a first delay circuit DLY1 302 and a second delay circuit DLY2 304. In the illustrated embodiment, the programmable delay circuit 300A also includes an inverter 306, an AND gate 308, a level shifter 310 and a driver 312. In addition, the programmable delay circuit 300A includes a controller 320 and a current inversion detector 322. These circuit elements are coupled together as seen in FIG. 3A, in an embodiment.

In some implementations, the programmable delay circuit 300A includes additional components, e.g., additional delay circuits, associated logic gates and current inversion detector that are used to generate the DC voltage during the second half cycle of the input AC signal. Such additional components are described in later sections herein below with respect to the power rectifier 300B. However, in some other implementations, a power rectifier includes the programmable delay circuit 300A to generate the DC voltage during the first half cycle of the input AC signal, and a second programmable delay circuit, distinct from but similar to the programmable delay circuit 300A, to generate the DC voltage during the second half cycle of the input AC signal.

The programmable delay circuit 300A couples a low side switch to the corresponding high side switch in the power rectifier. As shown, in some implementations, the first delay circuit DLY1 302 is coupled, at its input, to a gate of the low side switch. The output of the first delay circuit DLY1 302 is provided as an input to the second delay circuit DLY2 304, and also as an input to the AND gate 308. The output of the second delay circuit DLY2 304 is received at an input of the inverter 306, whose output is provided as a second input to the AND gate 308. The AND gate 308 performs a logical AND operation on the output signal of the first delay circuit DLY1 302 that is received from node A, and the output signal of the inverter 306 that is received from node B. In doing so, the AND gate 308 is configured to provide an output signal that is based on consideration of both the delay DLY1 of the first delay circuit and the delay DLY2 of the second delay circuit, where DLY1 and DLY2 are adjusted by the controller 320. Accordingly, the output of the AND gate 308 is used to trigger the high side switch based on delay adjustments made by the controller 320.

The output of the AND gate 308 is provided to the level shifter 310. The level shifter 310 converts the logic levels of the signal received from the AND gate 308 to match the logic levels used by the host electronic device (e.g., host device 130), and provides an output signal to the driver 312. The output of the driver 312 drives the gate of the high side switch.

The controller 320 adjusts the lengths of the delays DLY1 and DLY2 corresponding to the first delay circuit DLY1 302 and second delay circuit DLY2 304, respectively. In some implementations, the controller 320 is implemented as a digital state machine that operates in one of a plurality of states that include, for example, a configuration initialization state, an active state and a steady state, as described in greater detail in the following sections. For example, in an embodiment the controller 320 is implemented as firmware executed by a microprocessor, such as instructions encoded in a field programmable gate array (FPGA) or other suitable integrated circuit. In some implementations, the controller 320 is synthesized using Verilog, or other suitable hardware description language (HDL). In some implementations, the digital state machine of the controller 320 is configured such that a clock frequency corresponding to the state machine is synchronized with the frequency of the input AC signal. For example, when the power rectifier is used for high frequency operation, such as at 6.78 MHz in accordance the A4WP standard, the clock frequency is in the order of 6-7 MHz.

As described in greater detail in the following sections, the controller 320 adjusts the delays DLY1 and DLY2 starting from preselected initial values by incrementing or decrementing in steps, based on detecting current at the input and output of the power rectifier, and detecting when a current inversion occurs. In some implementations, the controller 320 receives information about current at the input and output of the power rectifier, and information about detection of current inversion, from the current inversion detector 322 that is coupled to the controller 320. In other implementations, the controller 320 includes circuitry configured to detect current at the input and output of the power rectifier, and/or to detect when a current inversion occurs.

In some implementations, the current detector 322 is implemented by generating a replica of the current in the low side switch (e.g., by mirroring the current in the low side switch) and by comparing it with a reference value, e.g., one that corresponds to an indication of current inversion. The replica of the current is generated by using a circuit, not seen, having one or more transistors that are included in the low side switch, in an embodiment. The replica of the current is injected into a resistor to convert the current into a voltage, which is compared with a reference voltage value, e.g., by using an inverter or an analog comparator. In some implementations, the reference voltage value is programmable, and is set to a value depending on a magnitude of current inversion that is to be detected. For example, the reference voltage value can be programmed to detect a current inversion from 20 mA (milli-amperes) to 120 mA. In some implementations, the reference voltage is programmed by setting a value in a register, e.g., by a user who programs various operating parameters of the power rectifier through a user interface provided by the host device (e.g., host device 130).

Considering the operation of the programmable delay circuit 300A during a positive half cycle of the input AC voltage, at the beginning of the half cycle, the outputs of the first delay circuit DLY1 302 and the second delay circuit DLY2 304 are zero. Accordingly, node A, which is at the output of the first delay circuit DLY1 302, is at a first level, while node B, which is at the output of the inverter 306, is at a second level due to inversion by the inverter 306. In some implementations, the first level corresponds to a low voltage level, while the second level corresponds to a high voltage level. In other implementations, the first level corresponds to a high voltage level, while the second level corresponds to a low voltage level. The following description is with respect to implementations in which the first level corresponds to a low voltage level and the second level corresponds to a high voltage level. A similar sequence is followed in cases where the first and second levels are reversed.

As soon as the input AC voltage becomes positive, e.g., during the positive half cycle of the input AC signal, the low side switch is turned on, which is indicated by the voltage signal at the gate of the low side switch going to the high level. From the instant at which the gate of the low side switch goes high, after delay DLY1 of the first delay circuit DLY1 302, the node A goes high. Since node B is already high, the output of the AND gate 308 (at node C) also goes high when the AND gate 308 receives the high output from node A and as long as the input from node B also remains high. The output of the AND gate 308 is provided to the driver 312 through the level shifter 310. The driver 312 then drives the gate of the high side switch to high. Consequently, the high-side switch is turned on.

From the instant in which the node A goes high, after delay DLY2, the output of the second delay circuit DLY2 304 goes high. This causes the output of the inverter 306 (at node B) to go low. As a consequence, the inputs to the AND gate 308 are different from each other, e.g., the voltage at node A is high while the voltage at node B is low, causing the output of the AND gate 308 (at node C) to go low, which is provided to the driver 312 through the level shifter 310. The driver 312 then drives the gate of the high side switch to low, leading to the high-side switch getting turned off.

Accordingly, as described above, the value of DLY1 determines the instant at which the high side switch is turned on, while the value of DLY2, which is delayed relative to the output of the first delay circuit DLY1 302, determines the time duration during which the high side switch remains in the on state. In some implementations, the first delay circuit DLY1 302, or the second delay circuit DLY2 304, or both, are implemented as programmable delay elements, or other suitable elements such as programmable counters, e.g., using a chain of flip-flops or other suitable buffers. The values of the delay DLY1 and/or the DLY2 are programmed in an embodiment using bits in the first delay circuit DLY1 302 and/or the second delay circuit DLY2 304, respectively. The range of values that can be programmed for DLY1 and/or DLY2 depends on the number of bits that are used. For a larger number of bits, a greater range of values can be programmed, leading to finer granularity in adjustment of the delays, compared to a case when a lesser number of bits is used. In some implementations, the first delay circuit DLY1 302, or the second delay circuit DLY2 304, or both, are implemented using analog components. For example, each delay circuit is implemented using a programmable current measure and a capacitor in some implementations.

As indicated above, in some implementations, the programmable delay circuit 300A implements the delay circuits DLY1 302 and DLY2 304 and the controller 320 using logic gates and flip-flops. These delay circuits replace high frequency comparators, which use large high voltage transistors, associated with the conventional high side switches in other conventional power rectifiers. The logic gates and flip-flops occupy substantially less area compared to the area occupied by the high voltage transistors of found in the conventional power rectifiers. For example, when a high frequency comparator with dimensions in the order of 150 nm (nanometers) is replaced with the programmable delay circuit 300A, the saving in the silicon area of a power rectifier integrated circuit is in the order of 0.5 mm$^2$ (square millimeters). In a full bridge power rectifier, two high side comparators are replaced with one or more programmable delay circuits that include multiple delay circuits, one or more controllers and current inversion detectors. The total savings in the silicon area in such cases can be in the order of 0.1 mm$^2$.

The power consumption of the logic gates and flip-flops are also considerably less compared to the power required for high frequency comparators, found in conventional rectifiers, which also typically produce comparable delays (e.g., in the order of 1 ns) at similar operating frequencies of the power rectifier circuit. For example, a high frequency side comparator can consume around 5-6 mA from the rectifier input voltage. Assuming a 10 V input voltage, this current consumption can result in a 50-60 mW (milliwatt) power consumption by a comparator. Accordingly, by replacing a high side comparator by the programmable delay circuit 300A, that consumes negligible power in comparison, around 50-60 mW savings in power can be achieved for a given unit of time. For a full bridge rectifier in which two high side comparators are replaced, the power savings can be in the order of 100-120 mW. Further, due to the use of the controller 320 to adjust the delay values associated with the delay circuits, as described in greater detail in the following sections, e.g., with respect to FIGS. 4-7, the rectifier device can be used over a wide frequency range, and/or can be adjusted for variations in the operating conditions, while maintaining high power of the device.

As indicated above, in some implementations, the controller 320 implements a state machine (e.g., synthesized using Verilog or other suitable HDL) that operates in one of three states to adjust DLY1 and DLY2 values. The three states are referred to as a configuration initialization state, an active state and a steady state. In the configuration initialization state, the controller 320 initializes the delay DLY1 corresponding to the first delay circuit DLY1 302 to a preselected large value and sets the delay DLY2 corresponding to the second delay circuit DLY2 304 to a preselected low value, and iteratively decreases the value of DLY1 upon detecting a current inversion. In some implementations, the preselected values of DLY1 and DLY2 are design parameters, e.g., provided in first and second registers whose bit values represent the delays DLY1 and DLY2, respectively. The preselected values are chosen by a designer of the rectifier, or by a user, in some implementations. When the current inversion is no longer detected, the controller 320 transitions to the active state of operation. As noted previously, in some implementations current inversions are detected by the current inversion detector 322. In some implementations, current inversions are detected by circuitry that is part of the controller 320. In some implementations, current inversions are detected by a combination of the current inversion detector 322 and circuitry included in the controller 320.

In the active state, the controller 320 further decrements the value of DLY1 in steps, while incrementing the value of DLY2 second delay in steps iteratively, until a current inversion is detected upon decrementing DLY1 or incrementing DLY2. When a current inversion is detected upon decrementing DLY1, the controller 320 adjusts DLY1 back by a step value to the value before the current inversion, and sets a first flag to high. When a current inversion is detected upon incrementing DLY2, the controller 320 adjusts DLY2 back to the value before the current inversion and sets a second flag to high. When both flags are high, DLY1 and DLY2 are determined to be at steady state values, and the controller 320 transitions to the steady state of operation.

In the steady state, the controller 320 maintains DLY1 and DLY2 values selected in the active state until a current inversion is detected. When a current inversion is detected in the steady state, the controller 320 reduces the time interval during which the high side switch is turned on until current inversions are not detected anymore, and then it transitions back to the active state to update the values of DLY1 and/or DLY2. On the other hand, if current inversions are not detected in the steady state, then after a preselected number of cycles of the input AC signal, the controller 320 transitions back to the active state to determine whether to maintain the present values of DLY1 and DLY2, or whether more suitable delay values can be determined by the iterative operations in the active state. The operation of the controller 320 in the various states of the state machine are described in greater detail in following sections.

FIG. 3B illustrates an example of a power rectifier 300B that includes a programmable delay circuit, e.g., the programmable delay circuit 300A. In some implementations, the power rectifier 300B is similar to the rectifier 124 included in the receiver 120. The power rectifier 300B is a full bridge rectifier. As described below, the power rectifier 300B includes a first pair of a low side switch and a corresponding high side switch, and associated delay circuits, to rectify the input AC voltage during the positive half cycle of the input AC voltage. The power rectifier 300B also includes a second pair of a low side switch and a corresponding high side switch, and associated delay circuits, to rectify the input AC voltage during the negative half cycle of the of the input AC voltage.

As shown, the power rectifier 300B receives an input AC voltage at the input lines or terminals 352*a* and 352*b*. The input AC voltage is represented by VSP and VSN, which indicate the positive and negative half cycles of the input AC signal, respectively. The power rectifier generates a DC voltage VRECT based on the input AC voltage, and outputs VRECT at the output line or terminal 354. The output DC voltage VRECT is used to charge an output capacitor 356, in an embodiment.

The generation of the DC voltage from the input AC voltage is done by the power switches M1, M2, M3 and M4. M1 and M3 are low side switches while M2 and M4 are high side switches. The gate of M3 is functionally coupled to the gate of the high side switch M2 (e.g., through one or more other circuit components such as the first delay circuit DLY1 302 and the second delay circuit DLY2 304, among other components), forming a first pair of switches used for rectification, while the gate of M1 is functionally coupled (e.g., through one or more other circuit components such as the third delay circuit DLY3 332 and the fourth delay circuit DLY4 334, among other components) to the gate of the high side switch M4, forming a second pair of switches used for rectification. In some implementations, the pair M3 and M2 rectify the input AC voltage during the positive half cycle of the input AC signal (e.g., when VSP>VSN), while the pair M1 and M4 rectify the input AC voltage during the negative half cycle of the input AC signal (e.g., when VSP<VSN). In other implementations, the correspondence between each pair of low side switch and high side switch, and the input AC signal half cycle, is reversed.

The power rectifier 300B includes the programmable delay circuit 300A, including various components that are used for generating the DC voltage during both half cycles of the input AC signal. For example, the power rectifier 300B includes the delay circuit DLY1 302, the second delay circuit DLY2 304, the inverter 306. AND gate 308, the level shifter 310, the driver 312, the current inversion detector 322 and the controller 320, which are described with respect to FIG. 3A. The input of the first delay circuit DLY1 302 is coupled to the gate of the low side switch M3 at node D. The output of the driver 312 is coupled to the gate of the high side switch M2. As described previously, the controller 320 is configured to adjust the delay DLY1 corresponding to the first delay circuit DLY1 302 and the delay DLY2 corresponding to the second delay circuit DLY2 304 such that the high side switch M2 is turned on when the low side switch M3 is turned on, and M2 remains on for as long as the input AC voltage is greater than the output DC voltage during one half cycle of the input AC signal, e.g., when VSP>VRECT. The controller 320 sets the delay DLY2 such that when a current inversion is detected, e.g., when VSP<VRECT, M2 is turned off.

In addition to the components described above, the programmable delay circuit 300A in the power rectifier 300B includes other components that are configured to control the second pair of switches, e.g., M1 and M4, to generate the output DC voltage during the other half cycle of the input AC voltage. For example, a third delay circuit DLY3 332 is coupled to the gate of the low side switch M1 at node E. The output of the third delay circuit DLY3 332 is provided as an input to a fourth delay circuit DLY4 334, and also as an input to an AND gate 338. The output of the fourth delay circuit DLY4 334 goes to an inverter 336, whose output is provided as a second input to the AND gate 338. The output of the AND gate 338 is forwarded to the level shifter 340, whose output is received at the driver 342 and used to drive the gate of the high side switch M4.

The operations of the third delay circuit DLY3 332 and the fourth delay circuit DLY4 334, the inverter 336, AND gate 338, level shifter 340 and driver 342 are similar to the operations of the corresponding components of the programmable delay circuit 300A that are described previously with respect to FIG. 3A. For example, during the negative half cycle of the input AC signal, as soon as the input AC voltage becomes negative, the low side switch M1 is turned on, which is indicated by the voltage signal at the gate of M1 going to the high level. From the instant at which the gate of M1 goes high, after delay DLY3 of the third delay circuit DLY3 332, the node E goes high. The voltage at node F is already high, causing the output of the AND gate 338 to high when the AND gate 338 receives the high output from node E. The output of the AND gate 338 is provided to the driver 342 through the level shifter 340. The driver 342 then drives the gate of the high side switch M4 to high. Consequently, the high-side switch M4 is turned on. From the instant in which the node E goes high, after delay DLY4, the output of the fourth delay circuit DLY4 334 goes high. This causes the output of the inverter 336 (at node F) to go low. As a consequence, the output of the AND gate 338 goes low, which is provided to the driver 342 through the level shifter 340. The driver 342 then drives the gate of the high side switch M4 to low, leading to the high-side switch M4 getting turned off.

In some implementations, the controller 320 is configured to control the delay DLY3 corresponding to the third delay circuit DLY3 332 and the delay DLY4 corresponding to the fourth delay circuit DLY4 334. Based on the values of DLY3 and DLY4, that the high side switch M4 is turned on when the low side switch M1 is turned on, and M4 remains on for as long as the input AC voltage is greater than the output DC voltage during the second half cycle of the input AC signal, e.g., when VSN>VRECT. The controller 320 sets the delay DLY4 such that when a current inversion is detected, e.g., VSN<VRECT, M4 is turned off. In some implementations, the current inversion during the second half cycle of the input AC signal is detected using the current inversion detector 324, which provides a signal indicating the detection of current inversion to the controller 320. In some other implementations, the controller 320 includes circuitry to detect current inversion during the second half cycle of the input AC signal.

In some implementations, a second controller is used to control the delay DLY3 corresponding to the third delay circuit DLY3 332 and the delay DLY4 corresponding to the fourth delay circuit DLY4 334. This is the case, for example, when distinct programmable delay circuits are used to control each pair of low side and high side switches. In such implementations, the controller 320 adjusts DLY1 and DLY2 and thereby controls the pair of switches M2 and M3 during the first half cycle of the input AC signal. The second controller is coupled to the third delay circuit DLY3 332 and the fourth delay circuit DLY4 334, and it adjusts DLY3 and DLY4 to control the pair of switches M1 and M4 during the second half cycle of the input AC signal. In some implementations, the second controller is coupled to the current inversion detector 324 to receive indication of current inversion detection during the second half cycle. The design and implementation of the second controller is similar to that of the controller 320 in some implementations. For example, in such cases, the second controller implements a state machine that operates in one of three states to adjust DLY3 and DLY4 values.

Figure 4:
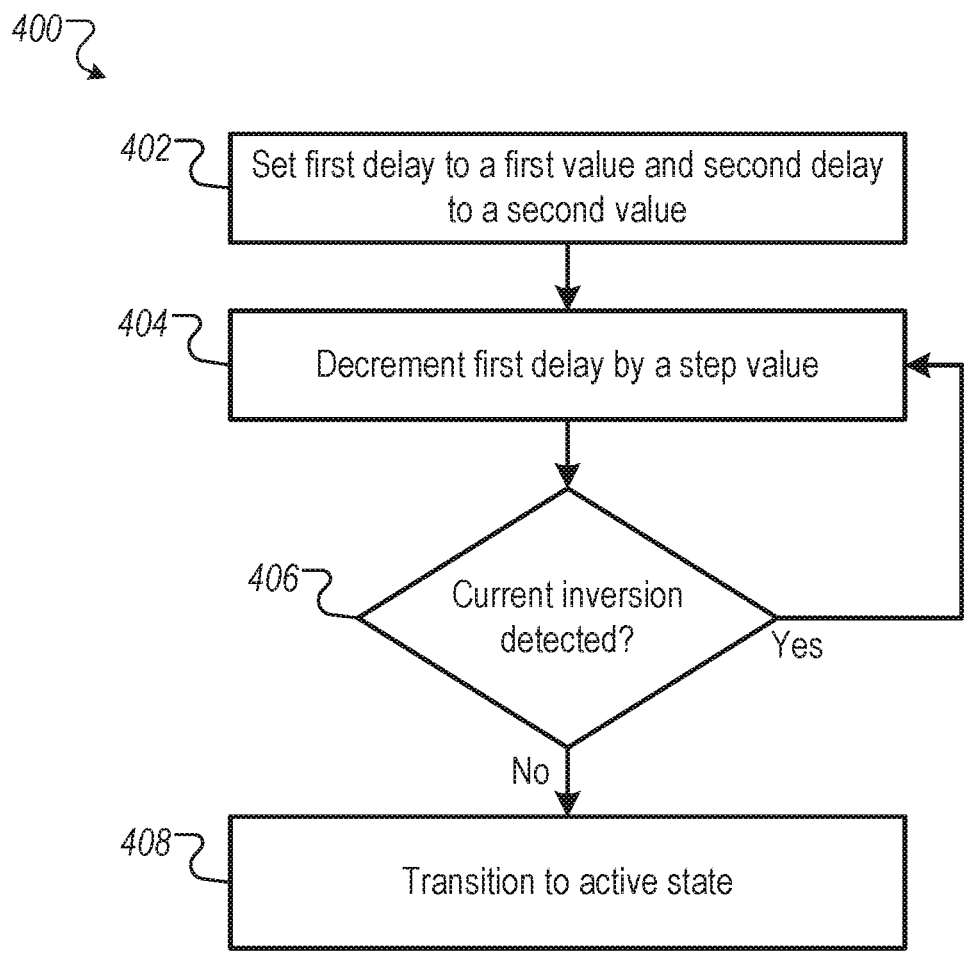
FIG. 4 illustrates an example of a process for configuration initialization state operations performed by a controller in a power rectifier, according to one or more implementations.

FIG. 4 illustrates an example of a process 400 for configuration initialization state operations performed by a controller in a power rectifier, according to one or more implementations. The process 400 is performed by the controller 320 as part of the configuration initialization state operations of the state machine implemented by the controller 320, for example, when initializing the delay values DLY1 and DLY2. Accordingly, the following sections describe the process 400 with respect to the controller 320 and the first delay circuit DLY1 302 and the second delay circuit DLY2 304. However, the process 400 also can be performed by the controller 320 for the third delay circuit DLY3 332 and the fourth delay circuit DLY4 334. Additionally or alternatively, the process can be performed by another controller.

At 402, the first delay is set to a first value and the second delay is set to a second value. For example, the controller 320 sets DLY1 to a preselected maximum value and DLY2 to a preselected minimum value.

At 404, the first delay is decremented by a step value. For example, the controller 320 decrements DLY1 to one step lower compared to the previous value. In implementations that use a number of bits to store the value of DLY1, the controller decrements the bit value by a least significant bit (LSB).

In this context, in some implementations, the value each bit corresponds to a unit of delay (for example, in the order of 0.1 ns) that is incremented or decremented in each step. By setting the bit to a first value (e.g., to '1' or '0', depending on the implementation), the corresponding delay is incremented by the associated unit (e.g., 0.1 ns). By setting the bit to a second value (e.g., to the converse '0' or '1', depending on the implementation), the corresponding delay is decremented by the associated unit (e.g., 0.1 ns).

In some implementations, the number of bits that store the value of DLY1 correspond to the bits of a register. Incrementing the delay by a step refers to incrementing the register value by a bit, which translates to an increase in the delay value by a corresponding one unit of delay (e.g., 0.1 ns). For example, in some implementations the register is an 8-bit register with a present value of 00001000, which corresponds to the value of DLY1 being 0.8 ns. After a stepwise increment, the register value changes to 00001001, and the value of DLY1 correspondingly increases by 0.1 ns to 0.9 ns. Conversely, decrementing the delay by a step refers to decrementing the register value by a bit, which translates to a decrease in the delay value by a corresponding one unit of delay (e.g., 0.1 ns). For example, if the present register and corresponding delay value of DLY1 are 00001000 and 0.8 ns respectively, then after a stepwise decrement, the register value changes to 00000111, which translates to a decrease in the value of DLY1 by 0.1 ns to 0.7 ns.

At 406, it is determined whether current inversion is detected. For example, the controller 320 checks whether it receives an indication of current inversion detection from the current inversion detector 322, after decrementing DLY1 by a step value.

If a current inversion is detected, then the process 400 reverts to 404 and decrements the first delay by a step value, and again performs the check for current inversion detection at 406. For example, the controller 320 decrements DLY1 by another step compared to the value set in the last iteration, and checks whether current inversion is detected, e.g., whether an indication of current inversion detection is received from the current inversion detector 322. The process iterates between 404 and 406 until a current inversion is no longer detected.

If a current inversion is not detected at 406, then at 408 a transition to the active state is made. For example, if after decrementing DLY1, the controller 320 does not receive any further indication of current inversion detection from the current inversion detector 322, then the controller 320 moves to the active state of operation, which is described in following sections.

Figure 5A:
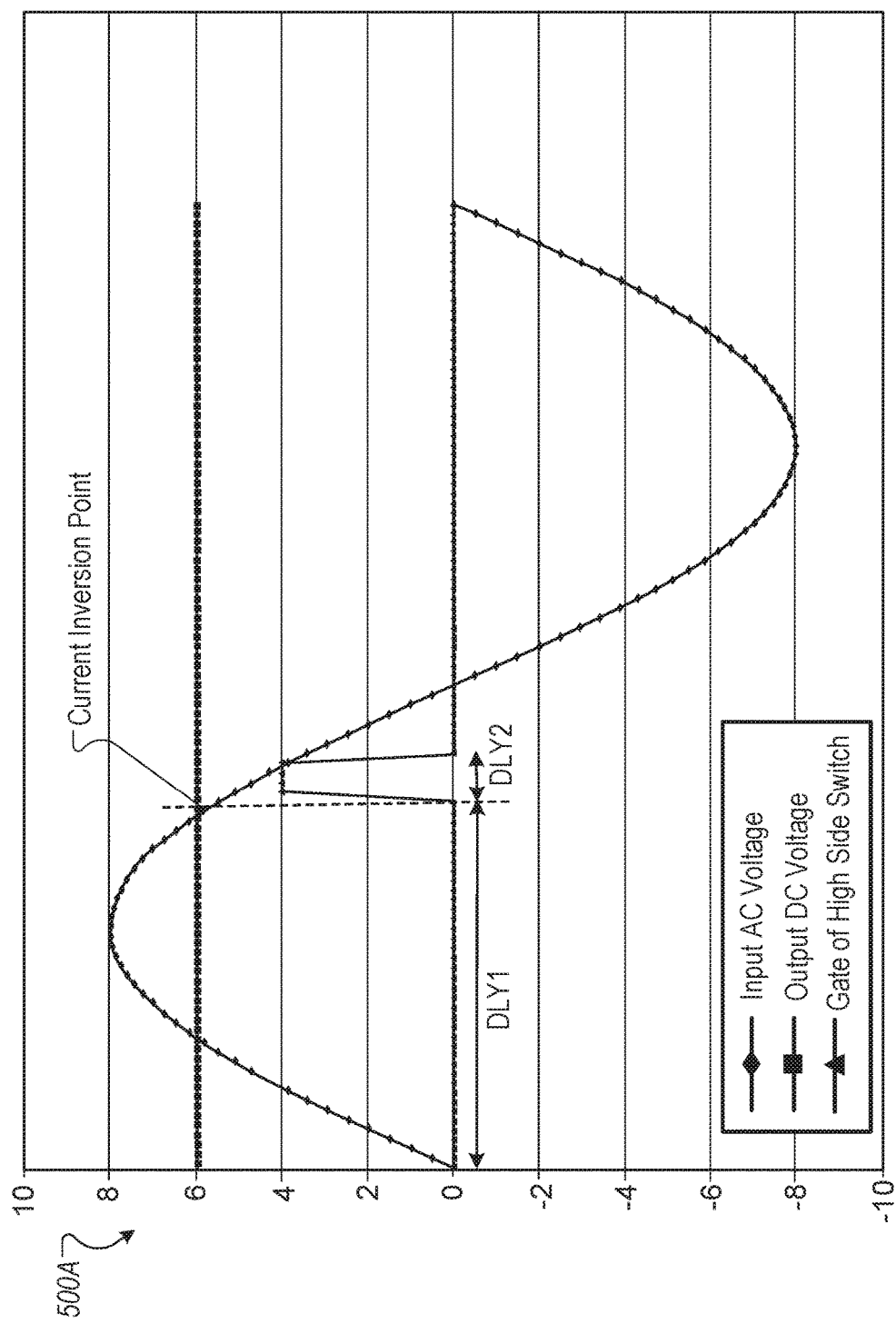
FIGS. 5A and 5B show examples of graphs representing delay characteristics in the configuration initialization state.
Figure 5B:
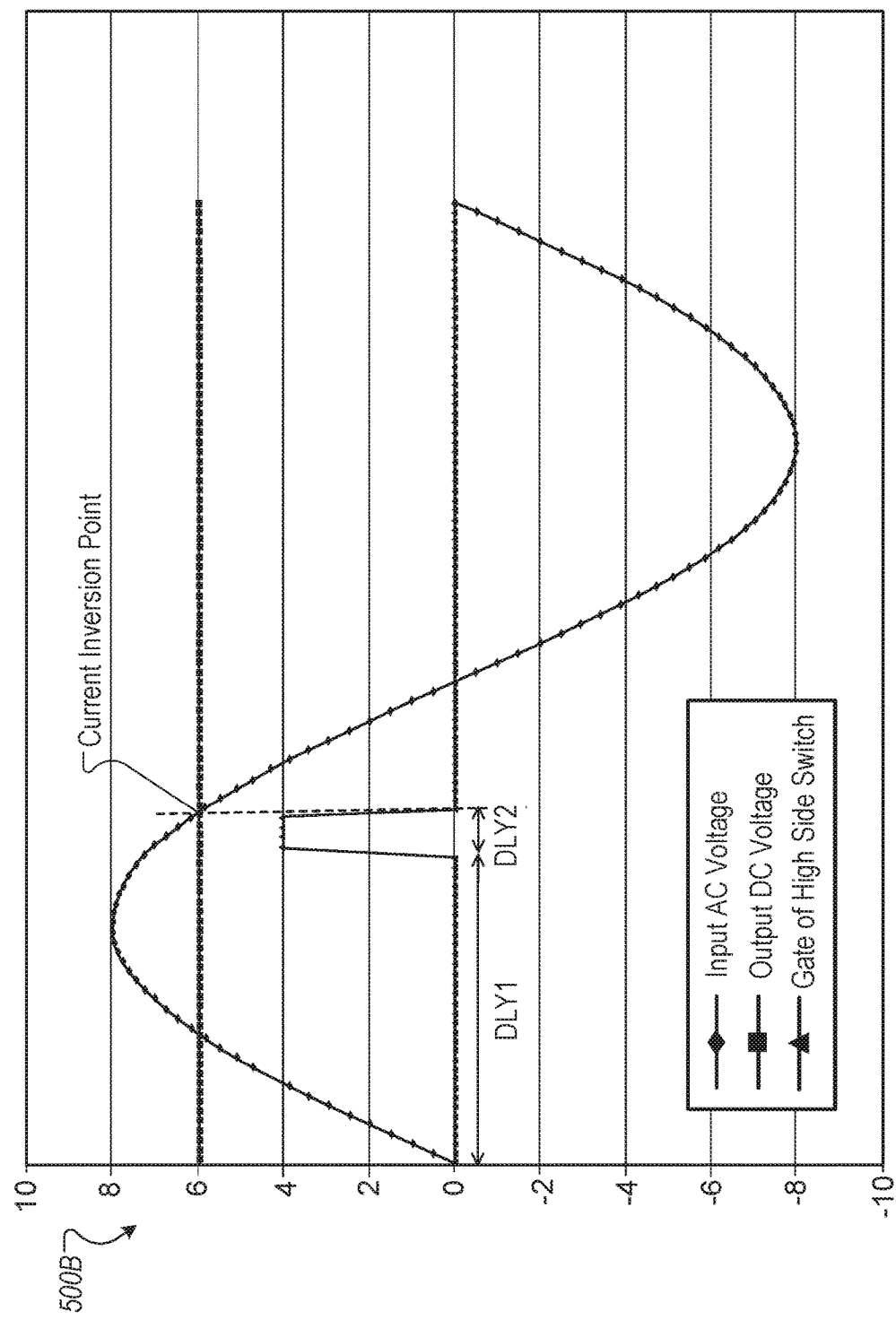

FIGS. 5A and 5B show examples of graphs 500A and 500B representing delay characteristics in the configuration initialization state. The graphs 500A and 500B indicate the voltage at the gate of a high side switch during one-half cycle (e.g., positive half cycle) of the input AC voltage. As described above with respect to the process 400, in some implementations, at the start of the configuration initialization state, the controller 320 sets the delay DLY2 to a preselected minimum value (MIN) and DLY1 to a preselected maximum value (MAX). Accordingly, as shown by the graph 500A in FIG. 5A, the high side switch. e.g., M2, is turned on after a known upper limit for the first delay (since DLY1=MAX) from the instant in which the low side switch, e.g., M3, is turned on and it remains on for the known lower limit for the second delay (since DLY2=MIN).

The graph 500A indicates that initially, in the configuration initialization state, the high side switch M2 is turned on at a time when the input AC voltage is lower than the output DC voltage, which can cause a current inversion that discharges the output capacitor 356. After setting DLY1 and DLY2 to the preselected initial values, the controller 320 decrements DLY1 iteratively until current inversions are not detected anymore. At this stage, the controller 320 moves to the active state.

The graph 500B indicates a possible turn on time of a high side switch at the end of the configuration initialization state. As shown, the high side switch M2 is turned on when the input AC voltage is larger than the output DC voltage, since current inversions are not detected anymore at the end of the process 400 at 408. However, M2 is turned on for the smallest possible time interval, since DLY2 remains at the preselected minimum value, which can cause a large efficiency loss. Accordingly, this is not a steady operating condition, but is a starting point for the active state.

Figure 6:
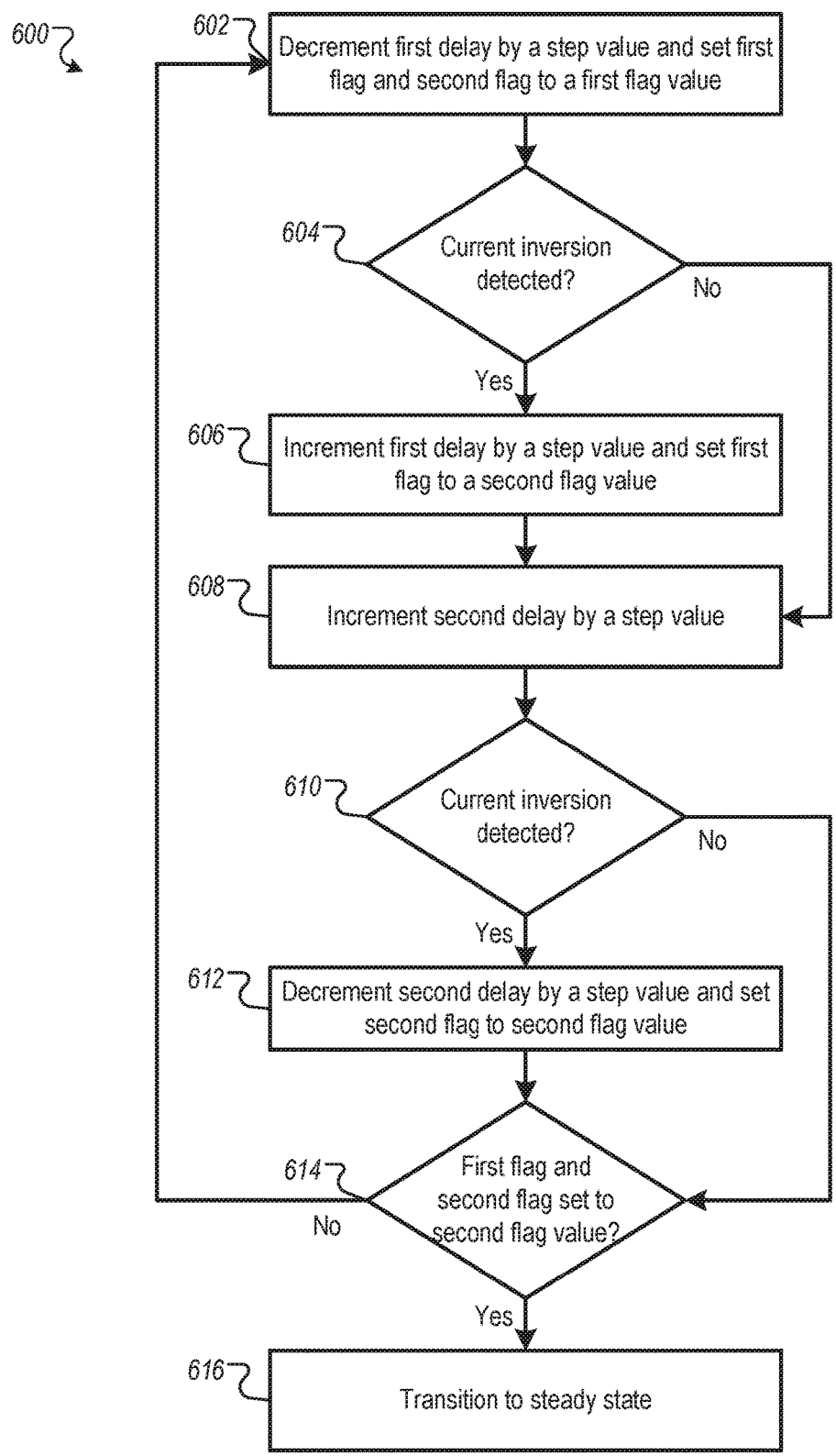
FIG. 6 illustrates an example of a process for active state operations performed by a controller in a power rectifier, according to one or more implementations.

FIG. 6 illustrates an example of a process 600 for active state operations performed by a controller in a power rectifier, according to one or more implementations. The process 600 is performed by the controller 320 as part of the active state operations of the state machine implemented by the controller 320, for example, to determine operational values for DLY1 and DLY2 after the controller 320 transitions to the active state from the configuration initialization state, which is described with respect to the process 400. Accordingly, the following sections describe the process 600 with respect to the controller 320 and the first delay circuit DLY1 302 and the second delay circuit DLY2 304. However, the process 600 also can be performed by the controller 320 for the third delay circuit DLY3 332 and the fourth delay circuit DLY4 334. Additionally or alternatively, the process can be performed by another controller.

At 602, the first delay is decremented by a step value and a first flag and a second flag are set to a first flag value. For example, the controller 320 decrements DLY1 to one step lower compared to the previous value. As indicated previously, e.g., with respect to FIG. 4, in some implementations, the bit value representing DLY1 is decremented by a least significant bit (LSB). At the start of the active state, the previous value of DLY1 is the value that was set by the controller 320 at the end of the configuration initialization state. Additionally, the controller 320 sets two flags, a first flag and a second flag, to a first flag value. In some implementations, the first flag value set for the first flag is same as the first flag value set for the second flag. In other implementations, different first flag values are set for the first flag and the second flag. In some implementations, the first flag is set to the numeric value of 0. In other implementations, the first flag value is some other suitable numeric value, e.g., 1 or −1. In some implementations, the first flag and the second flag are implemented in registers associated with the power rectifier. In other implementations, the first flag and the second flag are stored in memory associated with the power rectifier, e.g., memory included in the receiver 120.

At 604, a determination is made whether a current inversion is detected. For example, after decrementing DLY1 by a step value, the controller 320 checks whether it receives an indication of current inversion detection from the current inversion detector 322.

If a current inversion is detected at 604, then at 606, the first delay is incremented by a step value and the first flag is set to a second flag value. For example, detection of a current inversion indicates that the high side switch M2 has been turned on too early, when the input AC voltage still is smaller than the output DC voltage VRECT. The controller 320 increments DLY1 by one step higher to revert to the previous value when current inversions were not detected. Additionally, the controller 320 sets the first flag to a second flag value. In some implementations, the second flag value is 1, e.g., when the first flag value is 0. In other implementations, the second flag value is some other suitable number, e.g., 0 when the first flag value is either 1 or −1.

If current inversion is not detected at 604, or after the operations at 606, at 608 the second delay is incremented by a step value. For example, if a current inversion is not detected after decrementing DLY1 by a step value, then DLY1 is not increased back to the previous value and the first flag is not toggled. Instead, the controller 320 increments DLY2 to one step higher compared to the previous value. In implementations that use a number of bits to store the value of DLY2, the controller increments the bit value by a least significant bit (LSB). This means that the time interval during which the high side switch M2 stays on is increased by a unit of delay (e.g., 0.1 ns, as described previously) that corresponds to the LSB. At this stage, when DLY2 is adjusted for the first time in the active state, the previous value of DLY2 is the value that was set by the controller 320 at the end of the configuration initialization state (e.g., the minimum value). Subsequent adjustments to DLY2 at 608 are with respect to previous values that were set by the controller 320 in the active state.

In a manner similar to that described previously with respect to DLY1, in some implementations, the number of bits that store the value of DLY2 correspond to the bits of a register. For example, a first register is configured to represent DLY1, while a second register is configured to represent DLY2. Incrementing the delay DLY2 by a step refers to incrementing the second register value by a bit, which translates to an increase in the delay value by a corresponding one unit of delay (e.g., 0.1 ns). For example, in some implementations the second register is an 8-bit register with a present value of 00001000, which corresponds to the value of DLY2 being 0.8 ns. After a stepwise increment, the register value changes to 00001001, and the value of DLY2 correspondingly increases by 0.1 ns to 0.9 ns. Conversely, decrementing the delay by a step refers to decrementing the second register value by a bit, which translates to a decrease in the delay value by a corresponding one unit of delay (e.g., 0.1 ns). For example, if the present second register and corresponding delay value of DLY2 are 00001000 and 0.8 ns respectively, then after a stepwise decrement, the second register value changes to 00000111, which translates to a decrease in the value of DLY2 by 0.1 ns to 0.7 ns.

At 610, a determination is made whether a current inversion is detected. For example, after incrementing DLY2 by a step value at 608, the controller 320 again checks whether it receives an indication of current inversion detection from the current inversion detector 322.

If a current inversion is detected at 610, then at 612, the second delay is decremented by a step value and the second flag is set to a second flag value. For example, detection of a current inversion after incrementing DLY2 indicates that the high side switch M2 is turned off too late, after the input AC voltage becomes smaller than the output DC voltage VRECT. The controller 320 decrements DLY2 by one step lower to revert to the previous value when current inversions were not detected. Additionally, the controller 320 sets the second flag to a second flag value. In some implementations, the second flag value set for the second flag is same as the second flag value set for the first flag. In other implementations, different second flag values are set for the first flag and the second flag. Without loss of generality, the following sections describe the cases in which the first flag and the second flag are set to the same second flag value. In some implementations, the second flag value is 1, e.g., when the first flag value is 0. In other implementations, the second flag value is some other suitable number, e.g., 0 when the first flag value is either 1 or −1.

If current inversion is not detected at 610, or after the operations at 612, at 614 a check is performed whether the first flag and the second flag are set to the second flag value. For example, the controller 320 checks the value of the first flag and the second flag and determines whether both flags are set to the second flag value.

If at 614 it is determined that either the first flag, or second flag, or both, are not set to the second flag value, then the process 600 reverts to 602, and the operations described with respect to 602-614 are repeated, until both the first flag and the second flag are determined to be set to the second flag value at 614. For example, the controller 320 resets the first flag and the second flag to the first value, and iteratively adjusts the first delay and the second delay, checking for current inversion after each adjustment, and toggling the first and second flag values accordingly, as described above with respect to 602-614.

On the other hand, if at 614 it is determined that the first flag and the second flag are both set to the second flag value, then at 616 a transition to the steady state is performed. For example, if both the first flag and the second flag are set to the second flag value, this indicates that further adjustments, by decreasing DLY1 and/or increasing DLY2, are not needed. The controller 320 has determined values for DLY1 and DLY2 in which the high side switch M2 is turned on for the maximum time interval that is achievable in the power rectifier without causing a current inversion. Accordingly, the controller 320 moves to the steady state of operation, which is described in following sections.

In some implementations, the operating condition at the end of the active state is similar to that shown in the graph 200A. The high side switch M2 is turned on for the entire time interval, or nearly the entire time interval, during which the input AC voltage is larger than the output DC voltage VRECT. Accordingly, power efficiency of the power rectifier is maximized.

Figure 7:
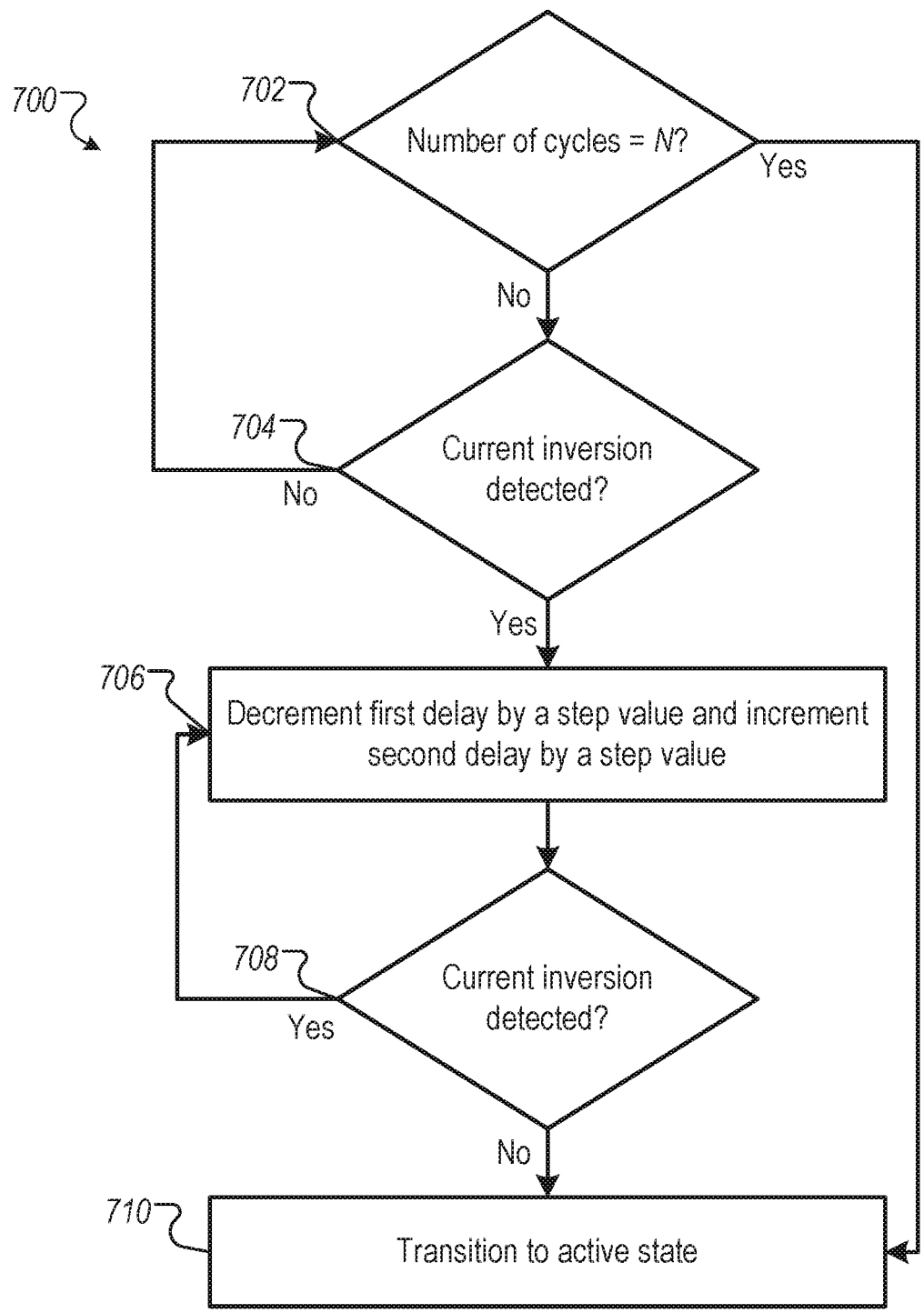
FIG. 7 illustrates an example of a process for steady state operations performed by a controller in a power rectifier, according to one or more implementations.

FIG. 7 illustrates an example of a process 700 for steady state operations performed by a controller in a power rectifier, according to one or more implementations. The process 700 is performed by the controller 320 as part of the steady state operations of the state machine implemented by the controller 320, for example, to periodically refresh operational values for DLY1 and DLY2 after the controller 320 transitions to the steady state from the active state, which is described with respect to the process 600. Accordingly, the following sections describe the process 700 with respect to the controller 320 and the first delay circuit DLY1 302 and the second delay circuit DLY2 304. However, the process 700 also can be performed by the controller 320 for the third delay circuit DLY3 332 and the fourth delay circuit DLY4 334. Additionally or alternatively, the process can be performed by another controller.

At 702, a check is performed whether a number of cycles of the input AC signal that have been performed, since the time a transition was last made into the steady state from the active state, equals a preselected number of cycles N. For example, after moving in to the steady state of operations, the controller 320 periodically checks whether N cycles of the input AC signal are completed since moving into the steady state (N being an integer >0). In some implementations, the value of N is programmable, e.g., written to a register or memory location associated with the power rectifier. N can be set to a suitable value, e.g., N=1000 cycles or N=2000 cycles.

If the number of cycles of the input AC signal equals the preselected number of cycles N, then at 710 a transition to the active state is performed. For example, after every N cycles of the input AC signal, the controller 320 moves from the steady state back to the active state. The controller 320 performs the periodic state reversion to confirm if the current delay values DLY1 and DLY2 are the best possible values, or whether external conditions have changed such that the values of DLY1 and/or DLY2 have to be updated.

If the number of cycles of the input AC signal does not equal the preselected number of cycles N, then operations in the steady state are maintained. At 704, a determination is made whether current inversion is detected. For example, the controller 320 checks whether it receives an indication of current inversion detection from the current inversion detector 322.

If no current inversion is detected, then the process 700 loops back to 702, and periodically checks either the number of cycles elapsed, or for current inversion, until one of the conditions is satisfied. When a current inversion is detected, this indicates that the operating conditions of the power rectifier have changed, e.g., due to a load transient or some other event, such that the delay values that were set at the time of the last transition from the active state to the steady state are no longer the best possible values. Accordingly, the delay values are updated in the steady state.

Upon detecting a current inversion at 704, at 706 the first delay is incremented by a step value and the second delay is decremented by a step value. For example, the controller 320 increments DLY1 to one step higher compared to the previous value of DLY1, and decrements DLY2 to one step lower compared to the previous value of DLY2. By doing so, the delay DLY1 is increased, such that the high side switch is turned on later, and the delay DLY2 is decreased, such that the high side switch is turned off earlier, until current inversions are not detected anymore. In implementations that use bits to store the values of DLY1 and DLY2, the controller 320 decrements the DLY1 bit value by a least significant bit (LSB), and increments the DLY2 bit value by an LSB.

At 708, a determination is made whether current inversion is detected. For example, after adjusting the values of DLY1 and DLY2 at 706, the controller 320 again checks whether it receives an indication of current inversion detection from the current inversion detector 322.

If a current inversion is detected at 708, then the process 700 reverts to 706 and further increments the first delay and decrements the second delay, and again performs the check for current inversion detection at 708. For example, the controller 320 increments DLY1 by another step, and decrements DLY2 by another step, compared to the respective values set in the last iteration, and checks whether current inversion is detected, e.g., whether an indication of current inversion detection is received from the current inversion detector 322. The process iterates between 706 and 708 until a current inversion is no longer detected.

When a current inversion is not detected at 708, then at 710 a transition to the active state is made. For example, if after adjusting the values of DLY1 and DLY2 at 706, the controller 320 does not receive any further indication of current inversion detection from the current inversion detector 322, the controller 320 moves back to the active state of operation, which is described in the previous sections.

In the manner described above, in the steady state, the controller 320 keeps the delay values determined in the active state, but responds to operating conditions variations that cause the need to update the delay values. If operating conditions variations happen, which can be manifested by the detection of current inversion in the steady state, the time interval during which the high side switch M2 is turned on is adjusted, e.g., reduced or increased depending on the situation. As described with respect to 706 and 708, in some implementations when a current inversion is detected in the steady state, the controller 320 selectively reduces the time interval during which the high side switch M2 is turned on until current inversions are not detected anymore. Then the controller 320 reverts to the active state to determine suitable new delay values for steady state operation of the power rectifier.

Figure 8A:
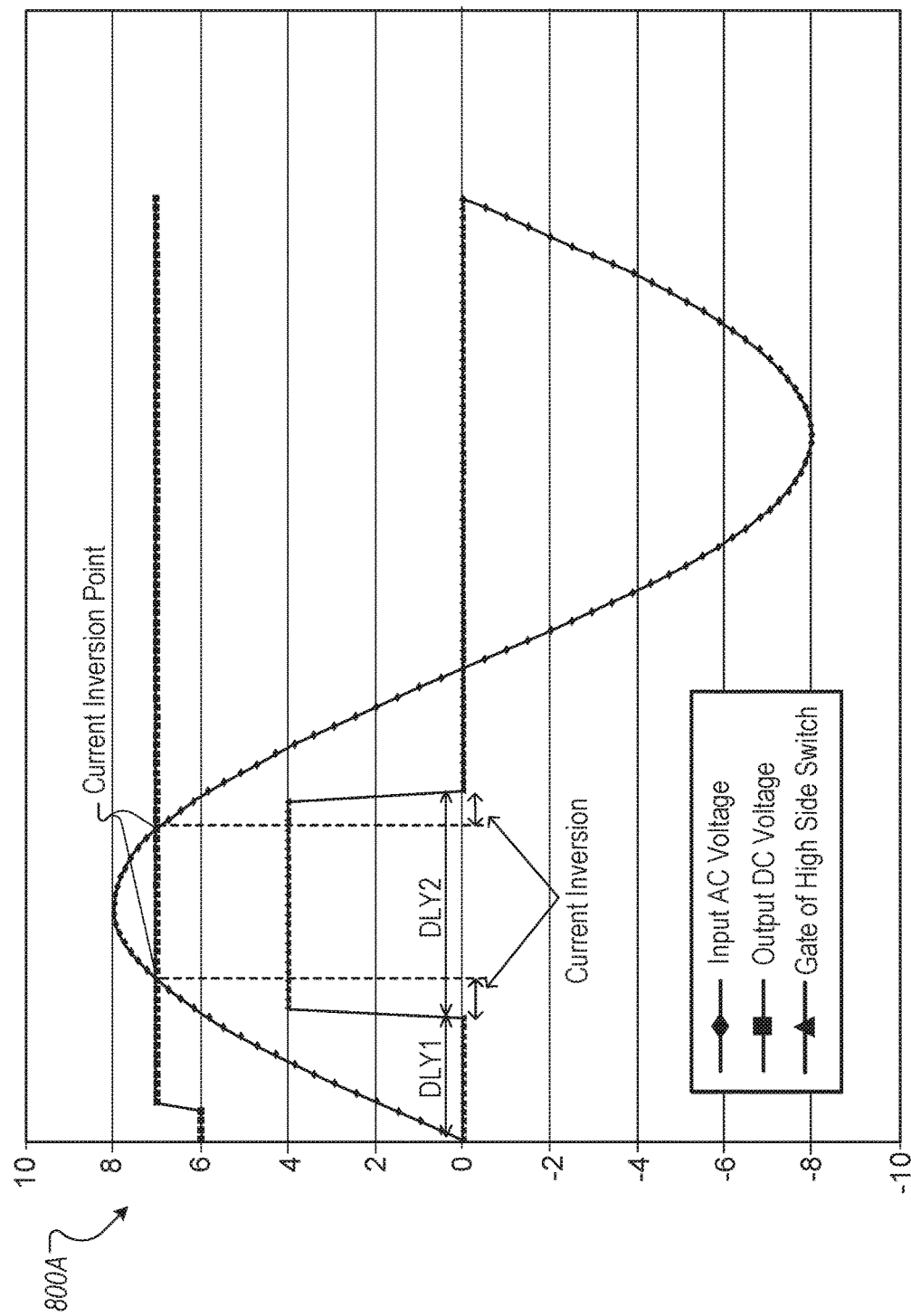
FIGS. 8A and 8B show examples of graphs representing delay characteristics in the steady state.
Figure 8B:
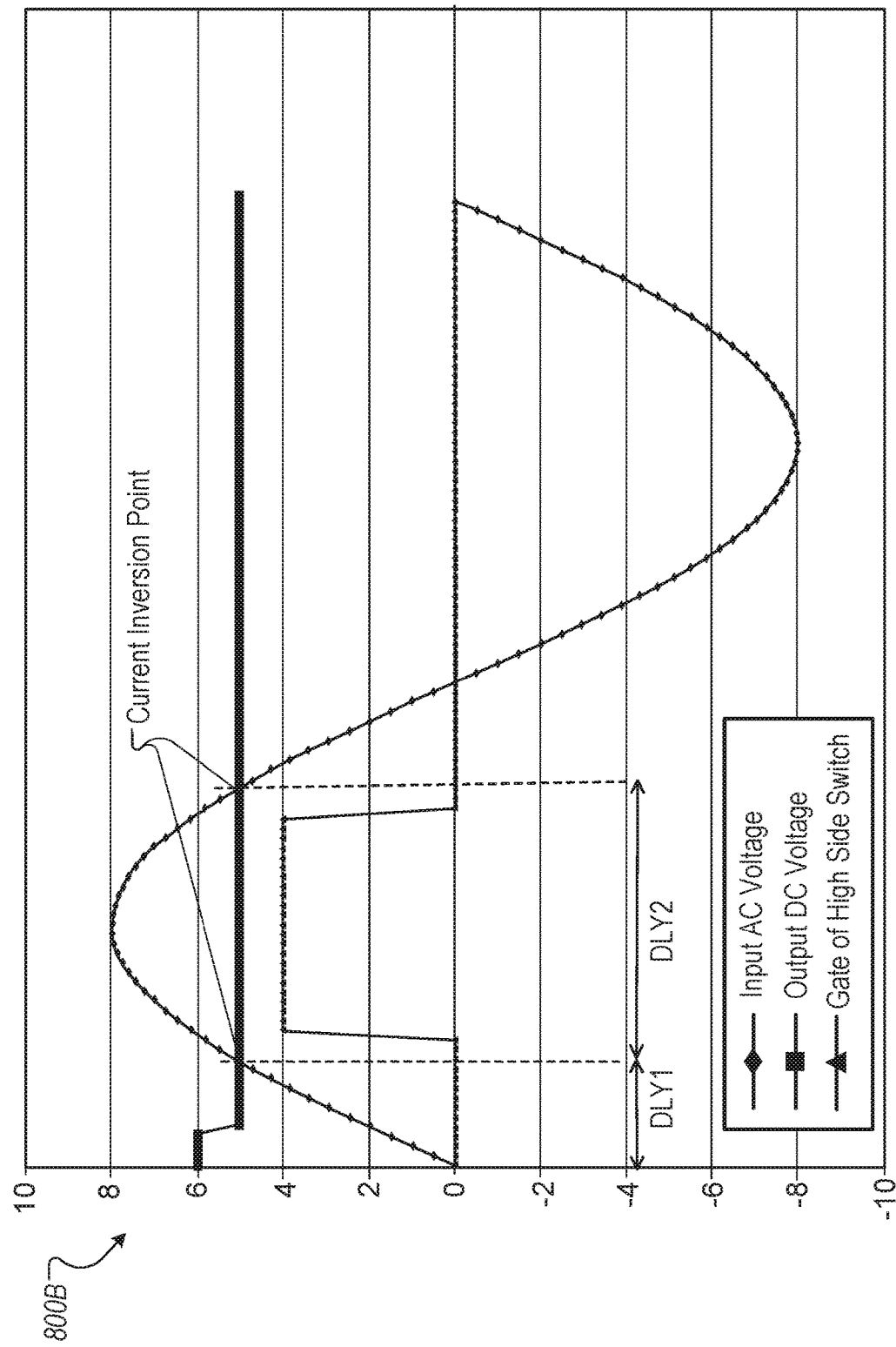

FIGS. 8A and 8B show examples of graphs 800A and 800B representing delay characteristics in the steady state. The graphs 800A and 800B plot the voltage at node C of the programmable delay circuit 300A during one-half cycle (e.g., positive half cycle) of the input AC voltage. As described above with respect to the process 700, in some implementations, due to changes in the operating condition of the power rectifier, the time interval during which the high side switch M2 is turned on becomes too large such that a current inversion is detected. An example of a change in operating condition is shown by the graph 800A in FIG. 8A, which illustrates that, due to an increase in the output DC voltage VRECT, the time interval during which the high side switch M2 is turned on results in a current inversion.

Upon detecting the current inversion, the controller 320 increases DLY1, such that the high side switch M2 is turned on later, beyond a point at which current inversion happens. The controller 320 also decreases DLY2, such that the high side switch is turned off earlier, before a current inversion is detected subsequent to turning on the high side switch. After making this adjustment in the steady state to address the immediate change in operating condition, the controller 320 moves back to the active state to determine new values for DLY1 and DLY2 that address the changed operating condition for long term operation.

A second example of a change in operating condition is shown by the graph 800B in FIG. 8B, which illustrates that, due to a decrease in the output DC voltage VRECT, the time interval during which the high side switch M2 is turned on is smaller than the maximum time interval possible without having current inversions, thereby also causing a power efficiency loss. In such cases, since a current inversion is not detected, the controller 320 does not adjust DLY1 and/or DLY2 in the steady state. Nevertheless, this variation in the operating condition is addressed when the controller 320 reverts to the active state after N cycles of the input AC signal. At this time in the active state, the controller 320 can decrease DLY1 and increase DLY2 to determine new steady state delay values that account for the change in operating conditions. In this manner, the controller 320 is able to react to variations in the operating conditions of the power rectifier, determining delay values for the delay circuits that lead to improved working configuration for the high side switches.

In some implementations, the configuration initialization state operations represented by the process 400 and the active state operations represented by the process 600 are performed when the rectifier device is initially powered up. In some implementations, the operations represented by the processes 400 and 600 are run after every power cycle of the power rectifier. In other implementations, the steady values determined during one run of the processes 400 and 600, are stored, e.g., in register or other suitable memory location associated with the power rectifier. In such cases, following a power cycle of the rectifier, the configuration initialization state operations need not be run again. Instead, the previously-stored steady state values are retrieved from memory and the controller 320 moves directly to the steady state.

In the manner described in the implementations above, a power rectifier, (e.g., 300B), is designed to include delay circuits (e.g., DLY1 302, DLY2 304, DLY3 332 and DLY2 304) and one or more controllers (e.g., 320), which replace comparators associated with high side switches in the rectifier. The delay circuits and the controller consume considerably less power compared to the comparators. Further, the delay circuits and the controller occupy substantially less silicon area of an integrated circuit in which the power rectifier is realized.

The controller is configured to adaptively adjust the delays associated with the delay circuits to determine ideal operational configuration for the high side switches, e.g., keeping the high side switches turned on for the maximum possible time without causing current inversion, thereby leading to increased efficiency of the power rectifier. Due to the adaptive nature of the controller, the power rectifier is configured to operate with high efficiency over a wide frequency range, e.g., from a range of several hundred kilohertz to a range of several megahertz. Accordingly, a power rectifier designed as described in the implementations above can be used in a versatile manner, yielding consistently high power efficiency. For example, the power rectifier can be used with the Qi wireless charger standard, which uses an operating frequency from 100 kHz to 205 kHz, and can also be used with the A4WP wireless charger standard, which uses an operating frequency of 6.78 MHz, apart from other suitable uses.

Only a few examples and implementations are disclosed. Variations, modifications, and enhancements to the described examples and implementations and other implementations can be made based on what is disclosed.

What is claimed is:

1. A method for rectifying alternating electrical current, comprising:
   controlling, by a controller in a power rectifier, a first delay corresponding to a first delay circuit in the power rectifier to turn on a high side switch in the power rectifier, wherein the high side switch provides a path for power from an input voltage line of the power rectifier to an output voltage line of the power rectifier;
   controlling a second delay corresponding to a second delay circuit in the power rectifier to maintain the high side switch in an on state so as to change a switching state of the high side switch based on detection, by a current inversion detector, of a current inversion associated with the input and output voltage lines of the power rectifier, the current inversion indicating a condition of current flow from an output of the power rectifier to an input of the power rectifier; and
   adapting the controller to operate in one of a plurality of states that are configured to provide different operating functionalities to control at least one of the first delay or the second delay based on the detection of current inversion by the current inversion detector, the plurality of states including a configuration initialization state, an active state and a steady state,
   wherein adapting the controller to operate in the active state comprises
      decrementing the first delay in stepwise increments and incrementing the second delay in stepwise increments responsive to detection of current inversion by the current inversion detector,
      setting values of a first flag and a second flag in response to decrementing the first delay or incrementing the second delay, the first flag and the second flag indicating occurrence or absence of current inversion in the power rectifier, and
      transitioning to the steady state based on setting values of the first flag and the second flag.

2. The method for rectifying alternating electrical current according to claim 1, wherein detection of the current inversion by the current inversion detector comprises:
   determining, by the current inversion detector, whether an output voltage of the power rectifier is greater than an input voltage of the power rectifier; and
   conditioned on determining that the output voltage of the power rectifier is greater than the input voltage of the power rectifier, sending an indication of a detection of current inversion to the controller.

3. The method for rectifying alternating electrical current according to claim 1, further comprising:
   decrementing, when the controller is in the active state, the first delay by a step value that corresponds to a unit length of delay, and setting the first flag and the second flag to a first flag value that indicates possible occurrence of current inversion in the power rectifier;
   determining whether a first current inversion is detected by the current inversion detector;
   conditioned on detecting the first current inversion, incrementing the first delay by a step value, and setting the first flag to a second flag value;
   incrementing the second delay by a step value;
   determining whether a second current inversion detection is detected;
   conditioned on detecting the second current inversion, decrementing the second delay by a step value, and setting the second flag to the second flag value;
   determining whether the first flag and the second flag are set to the second flag value;
   conditioned on determining that the first flag and the second flag are set to the second flag value, transitioning to the steady state; and
   conditioned on determining that at least one of the first flag or the second flag is not set to the second flag value, repeating operations of the active state until the first flag and the second flag are set to the second flag value.

4. The method for rectifying alternating electrical current according to claim 1, further comprising:
   when the controller is in the steady state:
      determining whether a preselected number of cycles of an input voltage of the power rectifier is completed;
      conditioned on determining that the preselected number of cycles is not completed, iteratively increasing the first delay by step values and decreasing the second delay by step values until a current inversion is detected by the current inversion detector; and
      in response to detecting the current inversion by the current inversion detector, transitioning back to the active state.

5. The method for rectifying alternating electrical current according to claim 1, further comprising:
   when the controller is in the configuration initialization state:
      initializing the first delay to a first delay value and initializing the second delay to a second delay value;
      iteratively decrementing the first delay by a step value while one or more current inversions are detected; and
      in response to not detecting a current inversion, transitioning to the active state.

6. A power rectifier comprising:
   a low side switch;
   a high side switch coupled to the low side switch, wherein the low side switch and the high side switch are configured to provide an electrical path for power from an input voltage line of the power rectifier to an output voltage line of the power rectifier;
   a first delay circuit and a second delay circuit coupled to control terminals of at least the high side switch, wherein a first delay of the first delay circuit controls a turn on time of the high side switch, and a second delay of the second delay circuit controls a turn off time of the high side switch; and
   at least one controller coupled to the first and second delay circuits, the controller configured to control the first delay and the second delay based on current inversions associated with the input and output voltage lines of the power rectifier, a current inversion indicating a condition of current flow from an output of the power rectifier to an input of the power rectifier,
   wherein the controller is an adaptive controller operable in one of a plurality of states that are configured to provide different operating functionalities to control at least one of the first delay or the second delay based on detection of current inversions, the plurality of states including a configuration initialization state, an active state and a steady state,
   wherein in the active state the adaptive controller is configured to
      decrement the first delay in stepwise increments and increment the second delay in stepwise increments responsive to detection of current inversion,
      set values of a first flag and a second flag in response to decrementing the first delay or incrementing the second delay, the first flag and the second flag indicating occurrence or absence of current inversion in the power rectifier, and transition to the steady state based on setting values of the first flag and the second flag.

7. The power rectifier of claim 6, further comprising a current inversion detector that is configured to:

compare an output voltage of the power rectifier to an input voltage of the power rectifier;

determine whether the output voltage of the power rectifier is greater than the input voltage of the power rectifier based on the comparison;

conditioned on determining that the output voltage of the power rectifier is greater than the input voltage of the power rectifier, detect an occurrence of a current inversion in the power rectifier; and upon detecting the occurrence of a current inversion, provide an indication of the current inversion detection to the controller.

8. The power rectifier of claim 6, wherein the adaptive controller is further configured to:

decrement, when the adaptive controller is the active state, the first delay by a step value that corresponds to a unit length of delay, and setting the first flag and the second flag to a first flag value that indicates possible occurrence of current inversion in the power rectifier;

determine an occurrence of a first current inversion;

in response to the occurrence of the first current inversion, increment the first delay by a step value, and set the first flag to a second flag value;

increment the second delay by a step value;

determine an occurrence of a second current inversion;

in response to the occurrence of the second current inversion, decrement the second delay by a step value, and set the second flag to the second flag value;

determine whether the first flag and the second flag are set to the second flag value;

in response to determining that the first flag and the second flag are set to the second flag value, transition to the steady state; and in response to determining that at least one of the first flag or the second flag is not set to the second flag value, repeat operations of the active state until the first flag and the second flag are set to the second flag value.

9. The power rectifier of claim 6, wherein the adaptive controller is configured to:

when in the steady state:

determine whether a preselected number of cycles of an input voltage of the power rectifier is completed;

conditioned on determining that the preselected number of cycles is not completed, iteratively increase the first delay by a step value and decrease the second delay by a step value until a current inversion is detected by a current inversion detector; and in response to detecting the current inversion by the current inversion detector, transition back to the active state.

10. The power rectifier of claim 6, wherein the adaptive controller is configured to:

when in the configuration initialization state:

initialize the first delay to a first delay value and initialize the second delay to a second delay value;

iteratively decrement the first delay by a step value while one or more current inversions are detected; and in response to not detecting a current inversion, transition to the active state.

11. The power rectifier of claim 6, wherein the power rectifier is configured to turn on or turn off the high side switch based on at least the first delay or the second delay, without performing a current comparison using a comparator coupled to the high side switch.

12. The power rectifier of claim 6, wherein the low side switch and the high side switch are configured to provide the path for power from the input line to the output line of the power rectifier during a first half cycle of an input voltage, wherein the first delay of the first delay circuit controls the turn on time of the high side switch with respect to a turn on time of the low side switch, and wherein the power rectifier further comprises:

a second high side switch;

a second low side switch coupled to the second high side switch, wherein the second low side switch and the second high side switch provide a path for power from the input voltage line of the power rectifier to the output voltage line of the power rectifier during a second half cycle of the input voltage; and a third delay circuit and a fourth delay circuit coupled to control terminals of at least the second high side switch, wherein a third delay of the third delay circuit controls a turn on time of the second high side switch, and a fourth delay of the fourth delay circuit controls a turn off time of the second high side switch, wherein the controller is coupled to the third and fourth delay circuits and configured to control the third delay and the fourth delay based on current inversions associated with the input and output voltage lines of the power rectifier.

13. The power rectifier of claim 6, wherein at least one of the first delay circuit or the second delay circuit includes a programmable counter that is configured to measure a corresponding delay.

14. The power rectifier of claim 13, wherein the programmable counter includes a number of bits that are configured to record a value of at least the first delay or the second delay.

15. The power rectifier of claim 6, wherein at least one of the first delay circuit or the second delay circuit includes one or more flip-flops.

16. The power rectifier of claim 6, wherein at least one of the first delay circuit or the second delay circuit includes one or more capacitors.

17. The power rectifier of claim 6, wherein the controller comprises a field programmable gate array (FPGA).

18. The power rectifier of claim 6, wherein the first delay circuit is coupled to an output of the low side switch and the second delay circuit is coupled to an output of the first delay circuit, wherein the power rectifier further comprises:

an inverter that is coupled to an output of the second delay circuit;

a logic gate that is coupled to the output of the first delay circuit and to an output of the inverter, the logic gate configured to provide an output based on a value of the first delay and a value of the second delay;

a level shifter that is configured to couple the output of the logic gate to a driver circuit; and the driver circuit that is configured to drive a gate of the high side switch based on the output of the level shifter.

19. An electronic device comprising:
a power input circuit that is configured to receive an alternating magnetic field from a power source and provide alternating current (AC) power to a power rectifier; and
the power rectifier coupled to the power input circuit, comprising:
a low side switch;
a high side switch coupled to the low side switch, wherein the low side switch and the high side switch are configured to provide an electrical path for power from an input voltage line of the power rectifier to an output voltage line of the power rectifier;
a first delay circuit and a second delay circuit coupled to control terminals of at least the high side switch, wherein a first delay of the first delay circuit controls a turn on time of the high side switch, and a second delay of the second delay circuit controls a turn off time of the high side switch; and
at least one controller coupled to the first and second delay circuits and configured to control the first delay and the second delay based on current inversions associated with the input and output voltage lines of the power rectifier, a current inversion indicating a condition of current flow from an output of the power rectifier to an input of the power rectifier,
wherein the controller is an adaptive controller operable in one of a plurality of states that are configured to provide different operating functionalities to control at least one of the first delay or the second delay based on detection of current inversions, the plurality of states including a configuration initialization state, an active state and a steady state,
wherein in the active state the adaptive controller is configured to
decrement the first delay in stepwise increments and increment the second delay in stepwise increments responsive to detection of current inversion,
set values of a first flag and a second flag in response to decrementing the first delay or incrementing the second delay, the first flag and the second flag indicating occurrence or absence of current inversion in the power rectifier, and
transition to the steady state based on setting values of the first flag and the second flag.

20. The electronic device of claim 19, wherein the power rectifier includes a current inversion detector that is configured to:
compare an output voltage of the power rectifier to an input voltage of the power rectifier;
determine whether the output voltage of the power rectifier is greater than the input voltage of the power rectifier based on the comparison;
conditioned on determining that the output voltage of the power rectifier is greater than the input voltage of the power rectifier, detect an occurrence of a current inversion in the power rectifier; and
upon detecting the occurrence of a current inversion, provide an indication of the current inversion detection to the controller.

21. The electronic device of claim 19, wherein the adaptive controller is configured to:
decrement, when the adaptive controller is the active state, the first delay by a step value that corresponds to a unit length of delay, and set the first flag and the second flag to a first flag value that indicates possible occurrence of current inversion in the power rectifier;
determine an occurrence of a first current inversion;
in response to the occurrence of the first current inversion, increment the first delay by a step value, and set the first flag to a second flag value;
increment the second delay by a step value;
determine an occurrence of a second current inversion;
in response to the occurrence of the second current inversion, decrement the second delay by a step value, and set the second flag to the second flag value;
determine whether the first flag and the second flag are set to the second flag value;
in response to determining that the first flag and the second flag are set to the second flag value, transition to the steady state; and
in response to determining that at least one of the first flag or the second flag is not set to the second flag value, repeat operations of the active state until the first flag and the second flag are set to the second flag value.

22. The electronic device of claim 19, wherein the adaptive controller is configured to:
when in the steady state:
determine whether a preselected number of cycles of an input voltage of the power rectifier is completed;
conditioned on determining that the preselected number of cycles is not completed, iteratively increase the first delay by a step value and decrease the second delay by a step value until a current inversion is detected; and
in response to detecting the current inversion, transition back to the active state.

23. The electronic device of claim 19, wherein the adaptive controller is configured to:
when in the configuration initialization state:
initialize the first delay to a first delay value and initialize the second delay to a second delay value;
iteratively decrement the first delay by a step value while one or more current inversions are detected; and
in response to not detecting a current inversion, transition to the active state.

24. The electronic device of claim 19, wherein the power rectifier is configured to turn on or turn off the high side switch based on at least the first delay or the second delay, without performing a current comparison using a comparator coupled to the high side switch.

25. The electronic device of claim 19, wherein the power source is external to the electronic device and is configured to generate the alternating magnetic field, and
wherein the power input circuit includes a coil that is configured to generate the alternating current in response to receiving the alternating magnetic field from the power source.

26. A wireless charger comprising:
a power input circuit including a coil that is configured to:
wirelessly receive, from an external power source, an alternating magnetic field;
generate, using the coil, an alternating current (AC) based on receiving the alternating magnetic field; and
provide the AC to a power rectifier;
the power rectifier that is configured to generate direct current (DC) power at its output, the power rectifier comprising:
a low side switch;
a high side switch coupled to the low side switch, wherein the low side switch and the high side switch are configured to provide an electrical path for power from an input voltage line of the power rectifier to an output voltage line of the power rectifier;

a first delay circuit and a second delay circuit coupled to control terminals of at least the high side switch, wherein a first delay of the first delay circuit controls a turn on time of the high side switch, and a second delay of the second delay circuit controls a turn off time of the high side switch; and at least one controller coupled to the first and second delay circuits and configured to control the first delay and the second delay based on current inversions associated with the input and output voltage lines of the power rectifier, a current inversion indicating a condition of current flow from an output of the power rectifier to an input of the power rectifier, wherein the controller is an adaptive controller operable in one of a plurality of states that are configured to provide different operating functionalities to control at least one of the first delay or the second delay based on detection of current inversions, the plurality of states including a configuration initialization state, an active state and a steady state, wherein in the active state the adaptive controller is configured to decrement the first delay in stepwise increments and increment the second delay in stepwise increments responsive to detection of current inversion, set values of a first flag and a second flag in response to decrementing the first delay or incrementing the second delay, the first flag and the second flag indicating occurrence or absence of current inversion in the power rectifier, and transition to the steady state based on setting values of the first flag and the second flag.

27. A wireless charging system, comprising:

a power source that is configured to:
  generate an alternating magnetic field; and
  wirelessly provide the alternating magnetic field to a receiver; and the receiver that is configured to generate direct current (DC) power based on the alternating magnetic field provided by the power source, the receiver comprising:
  a power input circuit that is configured to:
    wirelessly receive the alternating magnetic field from the power source;
    generate an alternating current (AC) based on receiving the alternating magnetic field; and
    provide the AC to a power rectifier; and
  the power rectifier that is configured to generate DC power at its output, the power rectifier comprising:
    a low side switch;
    a high side switch coupled to the low side switch, wherein the low side switch and the high side switch are configured to provide an electrical path for power from an input voltage line of the power rectifier to an output voltage line of the power rectifier;
    a first delay circuit and a second delay circuit coupled to control terminals of at least the high side switch, wherein a first delay of the first delay circuit controls a turn on time of the high side switch, and a second delay of the second delay circuit controls a turn off time of the high side switch; and at least one controller coupled to the first and second delay circuits and configured to control the first delay and the second delay based on current inversions associated with the input and output voltage lines of the power rectifier, a current inversion indicating a condition of current flow from an output of the power rectifier to an input of the power rectifier, wherein the controller is an adaptive controller operable in one of a plurality of states that are configured to provide different operating functionalities to control at least one of the first delay or the second delay based on detection of current inversions, the plurality of states including a configuration initialization state, an active state and a steady state, wherein in the active state the adaptive controller is configured to decrement the first delay in stepwise increments and increment the second delay in stepwise increments responsive to detection of current inversion, set values of a first flag and a second flag in response to decrementing the first delay or incrementing the second delay, the first flag and the second flag indicating occurrence or absence of current inversion in the power rectifier, and transition to the steady state based on setting values of the first flag and the second flag.

* * * * *